US008191779B2

(12) United States Patent
Illingworth et al.

(10) Patent No.: US 8,191,779 B2
(45) Date of Patent: Jun. 5, 2012

(54) WIRELESS MANAGEMENT OF REMOTE VENDING MACHINES

(75) Inventors: Shannon Wayne Illingworth, Corona, CA (US); James Winsor, Corona, CA (US)

(73) Assignee: AVT, Inc., Corona, CA (US)

( * ) Notice: Subject to any disclaimer, the term of this patent is extended or adjusted under 35 U.S.C. 154(b) by 38 days.

(21) Appl. No.: 11/588,422

(22) Filed: Oct. 27, 2006

(65) Prior Publication Data
US 2007/0095901 A1 May 3, 2007

Related U.S. Application Data

(60) Provisional application No. 60/730,369, filed on Oct. 27, 2005.

(51) Int. Cl.
G06F 7/08 (2006.01)
G06F 17/00 (2006.01)

(52) U.S. Cl. ........................ 235/381; 700/231
(58) Field of Classification Search .................. 235/381; 700/231, 236, 244
See application file for complete search history.

(56) References Cited

U.S. PATENT DOCUMENTS

| 5,056,029 | A | * | 10/1991 | Cannon | 700/233 |
|---|---|---|---|---|---|
| 5,091,713 | A | * | 2/1992 | Horne et al. | 340/541 |
| 5,243,174 | A | * | 9/1993 | Veeneman et al. | 235/381 |
| 5,555,497 | A | * | 9/1996 | Helbling | 705/14.1 |
| 5,625,562 | A | * | 4/1997 | Veeneman et al. | 700/235 |
| 5,844,808 | A | * | 12/1998 | Konsmo et al. | 700/244 |
| 6,014,089 | A | * | 1/2000 | Tracy et al. | 340/870.02 |
| 6,056,194 | A | * | 5/2000 | Kolls | 235/381 |
| 6,230,150 | B1 | * | 5/2001 | Walker et al. | 705/400 |
| 6,364,206 | B1 | * | 4/2002 | Keohane | 235/381 |
| 6,691,282 | B1 | * | 2/2004 | Rochford et al. | 715/234 |
| 6,957,113 | B1 | * | 10/2005 | Logsdon et al. | 700/100 |
| 6,959,230 | B1 | * | 10/2005 | Leibu et al. | 700/231 |
| 7,089,322 | B1 | * | 8/2006 | Stallmann | 709/238 |
| 7,260,730 | B2 | | 8/2007 | Sakaue | |
| 7,783,508 | B2 | * | 8/2010 | Murray et al. | 705/7 |
| 2004/0249711 | A1 | | 12/2004 | Walker et al. | |
| 2006/0293956 | A1 | | 12/2006 | Walker et al. | |

OTHER PUBLICATIONS

U.S. Office Action dated Jun. 13, 2011, issued in related U.S. Appl. No. 12/179,238.
U.S. Office Action dated Sep. 29, 2010, issued in related U.S. Appl. No. 12/179,238.
U.S. Office Action dated Mar. 10, 2011, issued in related U.S. Appl. No. 11/588,420.
U.S. Office Action dated Mar. 25, 2010, issued in related U.S. Appl. No. 11/588,420.
U.S. Appl. No. 11/588,420, filed Oct. 27, 2006.
U.S. Appl. No. 12/179,238, filed Jul. 24, 2008.

* cited by examiner

Primary Examiner — Jamara Franklin
(74) Attorney, Agent, or Firm — Venable LLP; Jeffri A. Kaminski; Christopher Ma

(57) ABSTRACT

A wireless system for managing a plurality of remote vending machines includes an enterprise control center; and a two-way wireless network coupling the enterprise control center and the plurality of remote vending machines. A touch screen may be associated with each of the plurality of vending machines for selecting items to be vended therein, and means for displaying a plurality of advertisements on the touch screen. The touch screen may also include means for paying for the items to be vended within the plurality of vending machines.

19 Claims, 31 Drawing Sheets

| | Alarm Class | Color | Edit |
|---|---|---|---|
| ☐ | 1 | Crimson | edit |
| ☐ | 2 | Red | edit |
| ☐ | 3 | Orange | edit |
| ☐ | 4 | purple | edit |
| ☐ | 5 | PeaGreen | edit |
| ☐ | 6 | Khaki | edit |

[Add Alarm Class] [Del Alarm Class]

Fig. 13

Add new alarm

Alarm class: 1
Colour: Crimson

[NEXT] [RESET] [CLOSE]

| VM NO. | VM Type | Address | Status | Power On/Off | Operative Status |
|---|---|---|---|---|---|
| 1 | avmdrink12 | sussex | Interrupted | On | Working |
| 2 | AE12CH | Hazel | Interrupted | On | Working |
| 3 | AVM-FC09 | washington | Interrupted | On | Working |
| 4 | VM001 | 14 Manhathan St. NY 98001 | Interrupted | On | Working |

Fig. 17

VM List

| | VM No. | VM Serial No. | VM type | Locate Area | Address | Operate | |
|---|---|---|---|---|---|---|---|
| ☐ | 1 | 12 | avmdrink12 | Harlem | sussex | Edit | fitting ware |
| ☐ | 2 | 2 | AE12CH | Queens | Hazel | Edit | fitting ware |
| ☐ | 3 | 3 | AVM-FC09 | Eastern river | washington | Edit | fitting ware |
| ☐ | 4 | 001 | VM001 | Manhathan | 14 Manhathan St. NY 98001 | Edit | fitting ware |

☐ Select All/None    [Return VM]

AVT vending machine online system

Operator: admin   Company: C3 Tech   Date: 2005-09-24 Time: 15:23:25   Logout

- features
- system admin
- marketing analysis
- sales info
- alarm
  - real time alarm
  - history alarm
    - by machine
    - by alarm
  - alarm type
  - alarm notice
    - ware wanting alarm
    - last transfer time VM Query:

Start Date: ____   End Date: ____
VM No.: [1-----sussex]
Alarm No.: [---]   [Query]

| malfunction Dsicription | Amounts |
|---|---|
| Drive panal no response | 6 |
| Wireless unit no response | 6 |
| System clock abnormal | 5 |
| Temp sensor abnormal | 5 |
| Deforest sensor malfunction | 1 |
| Engine malfunction | 54 |
| Print panal no response | 91 |
| Bill box taken away | 16 |
| Bill box full | 20 |
| Bill unit sensor malfunction | 18 |
| Bill unit engine malfunction | 18 |
| Bill unit block | 19 |
| Bill unit ROM checksum error | 18 |
| coin unit no response | 24 |
| coin receipt block | 19 |
| coin pay-out block | 21 |
| coin unit sensor malfunction | 42 |

Fig. 43

AVT vending machine online system

Operator: admin   Company: C3 Tech   Date: 2005-09-24 Time: 15:23:49   Logout

| | |
|---|---|
| Bill box taken away | 16 |
| Bill box full | 20 |
| Bill unit sensor malfunction | 18 |
| Bill unit engine malfunction | 18 |
| Bill unit block | 19 |
| Bill unit ROM checksum error | 18 |
| coin unit no response | 24 |
| coin receipt block | 19 |
| coin pay-out block | 21 |
| coin unit sensor malfunction | 42 |
| coin unit low voltage | 18 |
| coin unit ROM checksum error | 18 |
| 50 cents wanted | 18 |
| 1 dollar wanted | 18 |
| chute 1 malfunction | 19 |
| chute 2 malfunction | 11 |
| chute 3 malfunction | 14 |
| chute 4 malfunction | 16 |
| chute 5 malfunction | 9 |
| chute 6 malfunction | 11 |
| chute 7 malfunction | 7 |
| chute 8 malfunction | 7 |
| chute 9 malfunction | 8 |

Alarm Method List:

| Alarm No | description | Notification Method | Operate |
|---|---|---|---|
| 7910 | Drive panal no response | | Edit |
| 7911 | Wireless unit no response | send email | Edit |
| 7912 | System clock abnormal | send short message | Edit |
| 7913 | Temp sensor abnormal | | Edit |
| 7914 | Deforest sensor malfunction | send short message | Edit |
| 7915 | Engine malfunction | | Edit |
| 7916 | Print panal no response | | Edit |
| 7917 | VM wrecked | send short message | Edit |
| 7920 | Bill unit no response | send short message | Edit |
| 7921 | Bill box taken away | send short message | Edit |

Alarm Class List:

| | Alarm | Class | Operate |
|---|---|---|---|
| ☐ | Drive panal no response | 0 | edit |
| ☐ | Wireless unit no response | 1 | edit |
| ☐ | System clock abnormal | 2 | edit |
| ☐ | Deforest sensor malfunction | 3 | edit |
| ☐ | VM wrecked | 2 | edit |
| ☐ | Engine malfunction | 2 | edit |
| ☐ | Temp sensor abnormal | 1 | edit |
| ☐ | Bill unit no response | 4 | edit |
| ☐ | Bill box taken away | 1 | edit |
| ☐ | chute 1 malfunction | 6 | edit |

[Add New] [Delete selected Class]

Fig. 47

Edit Alarm Class:

| Alarm Type: | Drive panal no response |
|---|---|
| Alarm Class: | Hide ▾ |

Dropdown options: Hide, 1, 2, 3, 4, 5, 6

```
                                                        Help | Home
    AVT
         vending machine online system
    Operator: admin    Company: C3 Tech   Date: 2005-08-24 Time: 15:31:12   Logout features
  ⊕ system admin        Latest Data Transfer Time :
  ⊕ marketing analysis
  ⊕ sales info           | Vm No. |  Location  | Latest Transfer time  |
  ⊖ alarm                |   1    |   sussex   | 2005-04-27 14:35:00.0 |
      real time alarm    |   2    |   Hazel    | 2005-04-27 14:40:00.0 |
    ⊕ history alarm      |   3    | washington | 2005-04-27 14:40:00.0 |
    ⊕ alarm type
    ⊖ alarm notice
        list notofication
        ware wanting alarm
        last transfer time
```

*Fig. 54*

WIRELESS MANAGEMENT OF REMOTE VENDING MACHINES

CROSS REFERENCE TO RELATED APPLICATIONS

This application claims priority under 35 U.S.C. §119(e)(1) of Provisional Application No. 60/730,369, filed Oct. 27, 2005.

BACKGROUND OF THE INVENTION

The present-invention is related generally to automated vending machines, and more particularly to wireless management of remote vending machines.

The vending adage, "No cash, no purchase" is fast being replaced with "No cash, no problem!" Accompanying the public's increased attraction to self-service technologies and online applications is a growing interest in the implementation of alternative payment options for traditionally cash-based transactions. While some parts of the vending industry already accept card payment systems, widespread interest in expanded opportunities for cashless transactions are beginning to become more prevalent. Innovative payment technologies, designed to reshape vending transactions, have emerged and are being adopted at an unprecedented rate.

In the past, much of the slow rate of adoption of cashless vending can be attributed to customer reluctance to use cards for small dollar (i.e., low value) transactions, a lack of operator experience with new technology and its perceived high costs. Much of the customer concern, however, is being dissipated by the trend toward frequent use of cashless transactions elsewhere. For example, such technologies as ATM machines for banking, pay-at-the-pump for gasoline, retail store self-checkout, Speedpass® (a registered trademark of ExxonMobil Oil Corporation) purchasing and most recently the adoption of credit/debit card acceptance at quick fast food restaurants. From a vending operator's perspective, the cost of hardware, software and transaction processing have declined to render cashless a much more appealing payment option. Such conditions have started to draw the attention of full-line vendors, beverage bottlers and non-traditional vending suppliers as evidenced by the frequency of documented stories of success.

With more than eight million machines, the vending industry can be described as the largest cash business in the United States, and is certainly the most pervasive retail channel in terms of number of locations. A 2003 Nilson Report states, "Vending machine based (credit card) transactions are expected to be one of the growth areas for the payment processing industry in the U.S.

Although credit and debit cards generated only five million transactions valued at less than $32.5 million at vending terminals last year, these numbers could reach 200 million transactions valued at $570 million within three years." Over the past decade, there has been a steady increase in the preference for credit cards as a method of payment. Economists point to the fact that credit card transaction volumes doubled between 1992 and 1998. In 2003, credit and debit card payments exceeded cash payments for the first time; thereby rendering card purchasing the preferred payment method of U.S. consumers. This trend is predicted to accelerate, with credit purchasing growing at a rate of 7% per annum and debit transactions expanding at the unprecedented rate of 21% annually. To date, the vending industry, which is dependent on convenience and service, remains the only major retail channel that does not universally accept cashless forms of payment. It is estimated that only 2-3% of U.S. vending machines presently offer a credit card payment option. This capability is projected to be 50% by the year 2009.

However, when adding cashless to a cash-centric payment environment, there are several critical metrics that need to be evaluated. Among the first consideration is a comparison of transaction speeds. How much slower or faster are vending cashless transactions than cash-based sales? What is an acceptable time for transaction processing? In addition, an analysis of the number of transactions and average revenue per transaction are also important evaluative criteria, including incremental revenue and unit sales and margin contribution. Knowing the operational benefits of cashless transactions on total revenue, trade loss and accountability and the like, is important when determining adoption of this technology.

In a recent study, a cold drink bottler placed two vending machines containing identical product offerings in the field. The only difference between the machines was that one machine accepted only cash transactions, while the other featured only credit card transactions. Other things assumed equal, the credit card transaction machine generated 15% more revenues and 47% of its transactions involved multiple product purchases. The fast food industry as well has announced great success with its recent addition of credit and debit card acceptance. Check averages for credit and debit card transactions showed a 35-38% increase over cash purchases. These gains were attributed to the enhanced customer payment convenience. Other success stories include significant growth in popularity of cashless transactions within the travel industry, higher vending prices and unit sales in the entertainment industry and the elimination of vandalism and theft for vending in the hotel industry.

Nevertheless, there are two major impediments to widespread adoption of cashless transactions with remote vending machines. The first is the absence of any reliable, two-way communication between such vending machines and the databases supporting those vending machines. The second is the absence of any means to further leverage the success of such vending machines by supplementing their revenue from product sales with advertising revenue.

BRIEF DESCRIPTION OF THE DRAWINGS

Embodiments of the invention will now be described in connection with the associated drawings, in which:

FIGS. 6 through 54 depict a plurality of graphical user interfaces used in various embodiments of the multimedia system and method of controlling vending machines according to the present invention.

DETAILED DESCRIPTION OF THE INVENTION

Figure 1:
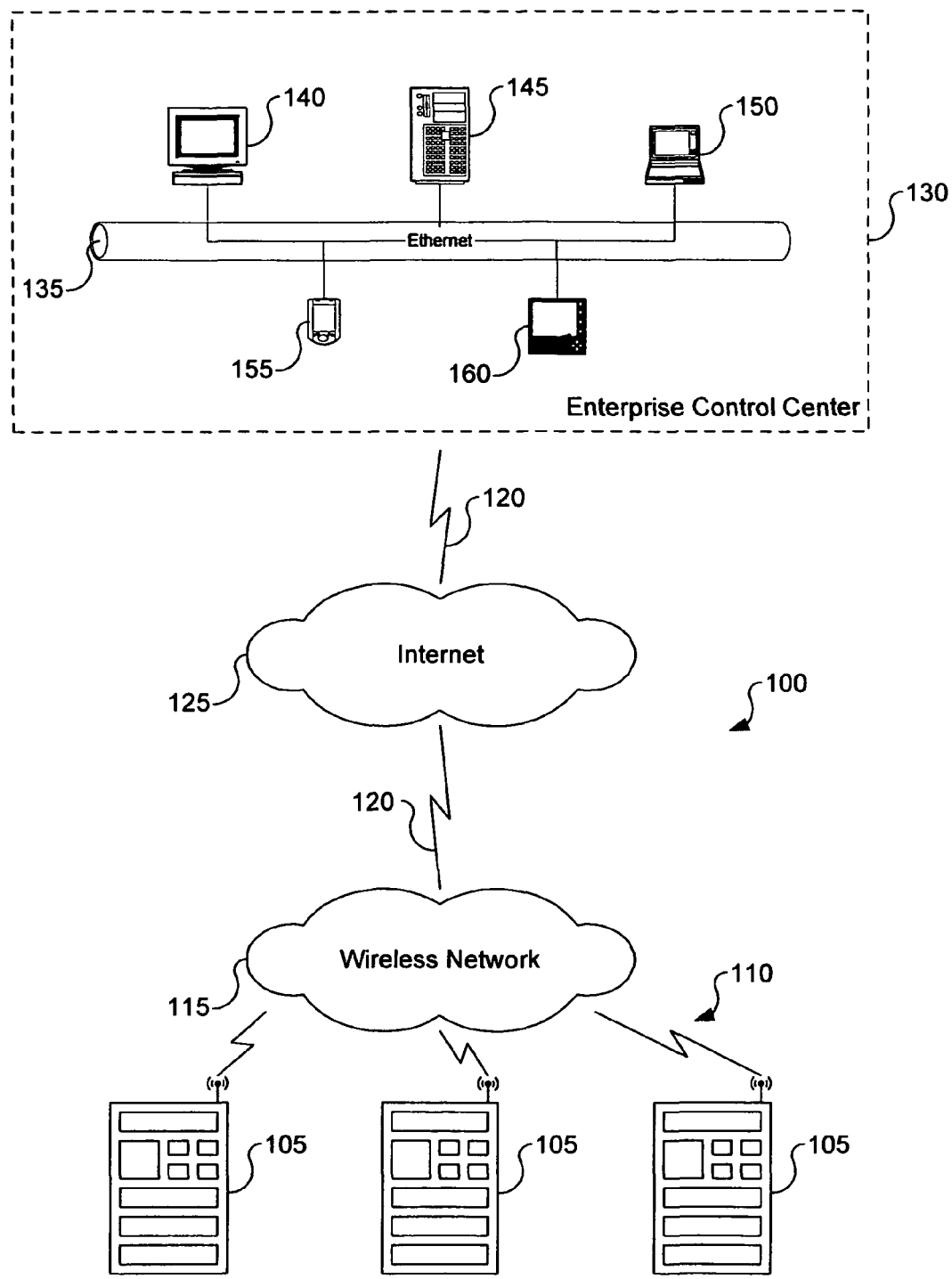
FIG. 1 depicts a block diagram of a multimedia system and method for controlling a plurality of vending machines according to one embodiment of the present invention.

Embodiments of the present invention may include apparatuses for performing the operations disclosed herein. An apparatus may be specially constructed for the desired purposes, or it may comprise a general-purpose device selectively activated or reconfigured by a program stored in the device.

Embodiments of the invention may be implemented in one or a combination of hardware, firmware, and software. Embodiments of the invention may also be implemented as instructions stored on a machine-readable medium, which may be read and executed by a computing platform to perform the operations described herein. A machine-readable medium may include any mechanism for storing or transmitting information in a form readable by a machine (e.g., a computer). For example, a machine-readable medium may include read only memory (ROM); random access memory (RAM); magnetic disk storage media; optical storage media; flash memory devices; electrical, optical, acoustical or other form of propagated signals (e.g., carrier waves, infrared signals, digital signals, etc.), and others.

In the following description and claims, the terms "computer program medium" and "computer readable medium" may be used to generally refer to media such as, e.g., but not limited to removable storage drive, a hard disk installed in hard disk drive, and signals, etc. These computer program products may provide software to computer system. The invention may be directed to such computer program products.

References to "one embodiment," "an embodiment," "example embodiment," "various embodiments," etc., may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, and as may be apparent from the following description and claims, it should be appreciated that throughout the specification descriptions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In a similar manner, the term "processor" may refer to any device or portion of a device that processes electronic data from registers and/or memory to transform that electronic data into other electronic data that may be stored in registers and/or memory. A "computing platform" may comprise one or more processors.

Embodiments of the present invention may also include apparatuses and systems for performing the operations described herein. An apparatus or system may be specially constructed for the desired purposes, or it may comprise a general-purpose device selectively activated or reconfigured by a program stored in the device.

Referring now to the drawings, wherein like reference numerals and characters represent like or corresponding parts and steps throughout each of the several views, there is shown in FIG. 1 a block diagram of a multimedia system 100 for controlling a plurality of vending machines 105 according to one embodiment of the present invention. Each of the plurality of vending machines 105 is wirelessly coupled by a first coupling means 110 to a wireless network 115. The wireless network 115, in turn, is coupled by a second coupling means 120 to a large-scale network such as the Internet 125. It should be understood that the foregoing use of the term "Internet" is not intended to limit the present invention to a network also known as the World Wide Web. Embodiments according to the present invention may likewise include intranets, extranets, Virtual Private Networks (VPNs), and the like.

Such second coupling means 120 may also be used to couple communications from the plurality of vending machines 105, through the wireless network 115 and Internet 125, to an enterprise control center 130. In turn, the enterprise control center may comprise a local area network of computers coupled together by way of an Ethernet 135. Such computers may comprise a desktop computer or workstation 140, a tower computer or server 145, a laptop computer 150, a personal digital assistant (PDA) 155, or a pen-based notebook 160.

Figure 2:
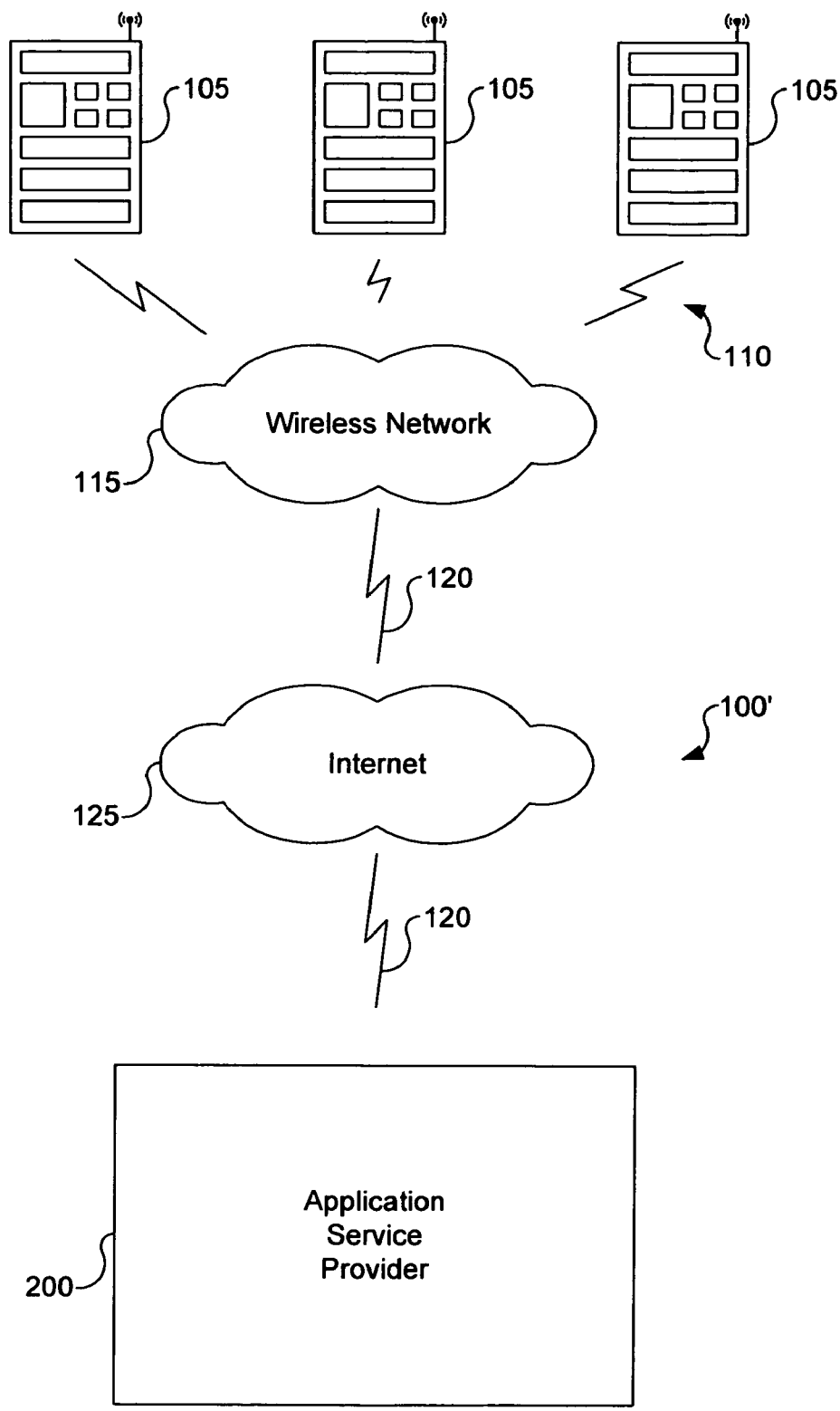
FIG. 2 depicts a block diagram of a multimedia system and method for controlling a plurality of vending machines according to another embodiment of the present invention.

Referring now to FIG. 2, there is shown a block diagram of a multimedia system 100' for controlling a plurality of vending machines 105 according to another embodiment of the present invention. Each of the plurality of vending machines 105, like the system 100 shown in FIG. 1, is wirelessly coupled by a first coupling means 110 to a wireless network 115. The wireless network 115, in turn, is coupled by a second coupling means 120 to a large-scale network such as the Internet 125. In the embodiment according to FIG. 2, however, system 100' is adapted to be controlled by an application service provider (ASP) means 200.

Figure 3:
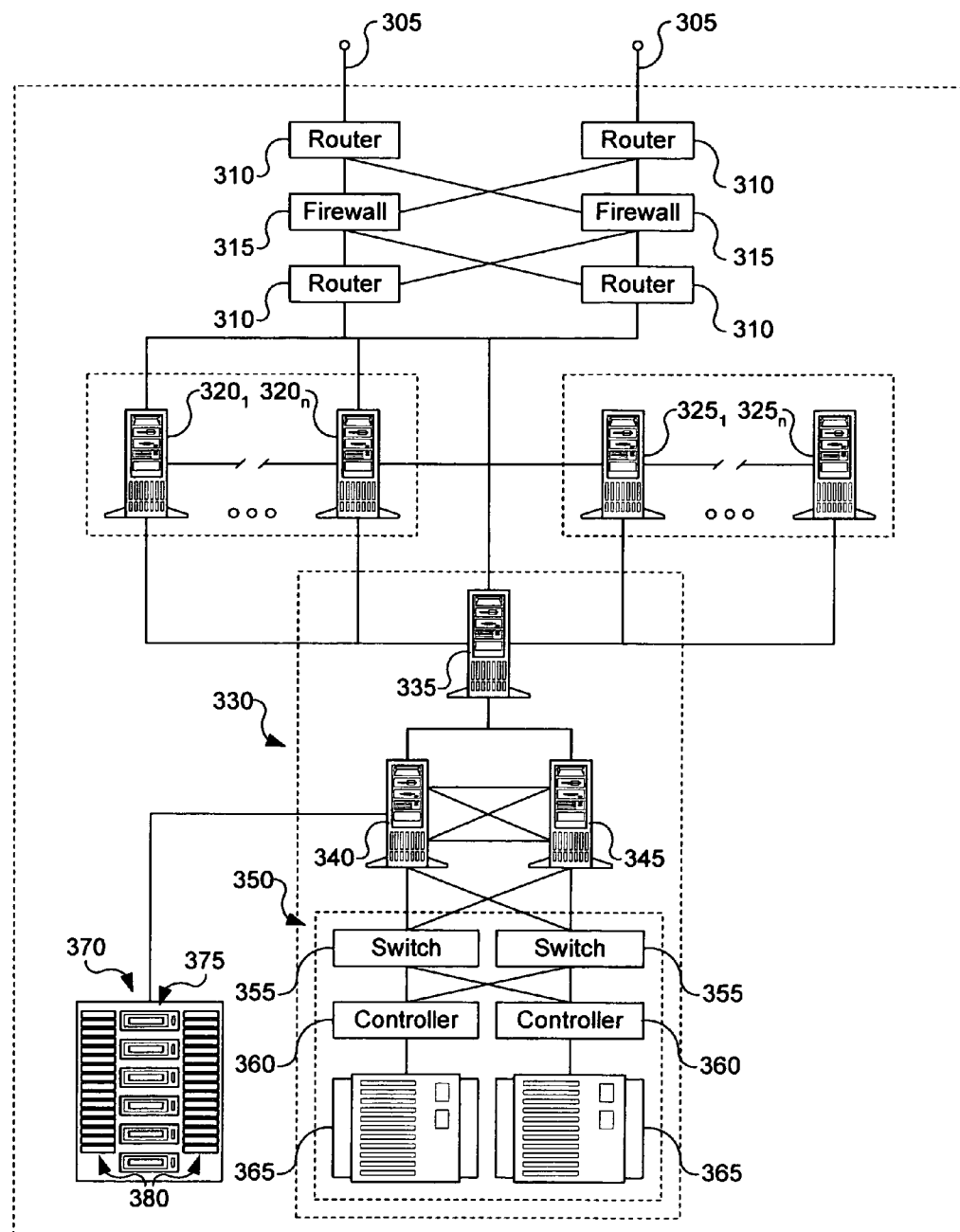
FIG. 3 depicts a block diagram showing in greater detail the application service provider means of FIG. 2.

Referring now to FIG. 3, there is shown in greater detail a schematic diagram of the ASP means 200 depicted generally in FIG. 2. As with the system 100 shown FIG. 1, ASP means 200 is adapted to be accessed for two-way communications with a plurality of remote vending machines 105 by way of the Internet 125 (neither of which is shown in FIG. 3).

In order to facilitate such communications, a pair of Internet access lines 305 (e.g., primary and shadow conventional T3 lines) may be cross-connected from the Internet backbone (not shown in FIG. 3) to one or more, and preferably a pair of redundant routers 310. Incoming traffic from the first of such routers 310 is then suitably directed through a firewall 315 to the second of such routers 310. Even more preferably, and for the sake of redundancy, two firewalls 315 may be cross-connected as shown in FIG. 3. An exemplary router 310 may be the SmartSwitch Router 8000, manufactured by the Enterasys Networks division of Cabletron Systems, Andover, Mass. U.S.A. An exemplary firewall 105 may be of the form of an IP network application platform (e.g., the IP650, IP440, or IP330 firewall platforms, which are manufactured by Nokia Group, Espoo, Finland).

A plurality of web servers $320_1 \ldots 320_n$ may, thus, be conveniently load balance by use of the foregoing configuration. That is, the load of incoming traffic from the Internet 125, through the routers 310 and firewalls 315, may be balanced among each of the web servers $320_1 \ldots 320_n$, such that: (1) certain incoming traffic is routed to a particular web server $320_1 \ldots 320_n$, where that particular web server $320_1 \ldots 320_n$ had been recently used by a given user whose information had been cached on that particular web server $320_1 \ldots 320_n$ and, as a result, it would be more efficient to continue to use that particular web server $320_1 \ldots 320_n$; or (2) no single one of the web servers $320_1 \ldots 320_n$ would come overburdened.

In one embodiment of the present invention, there may be three such web servers. Each of those web servers $320_1 \ldots 320_n$ may, in turn, be inexpensively comprised of a Dell™ PowerEdge™ 2450 server (manufactured by Dell Computer Corporation, Austin, Tex. U.S.A.), with a 733 MHz Pentium III processor, 256 MB RAM, and dual, mirrored 9.1 GB fixed disk drives. Preferably, each of those web servers $320_1 \ldots 320_n$ may further comprise a Microsoft® Windows® NT operating system, and Netscape Enterprise Server, Release 3.6.3 (developed by Netscape Communications, a subsidiary of America Online, Inc., Dulles, Va. U.S.A.). Optionally, Netscape's Certificate Server may also be installed on each of the web servers $320_1 \ldots 320_n$ to facilitate core digital certificate-issuance and management services, as well as distribution of certificates and certificate-revocation lists to clients and other servers. Other forms of certificate servers (e.g., web certificate servers and wireless certificate servers, which are available from VeriSign, Inc., Mountain View, Calif. U.S.A.) may likewise be deployed on each of the web servers $320_1 \ldots 320_n$.

The ASP means 200 of system 100' may further comprise a plurality of application servers $325_1 \ldots 325_n$, coupled to the web servers $320_1 \ldots 320_n$. In one embodiment of the present invention, there are six such application servers. Each of the application servers $325_1 \ldots 325_n$ may, like the web servers $320_1 \ldots 320_n$, be inexpensively comprised of a Dell PowerEdge 2450 server, with a 733 MHz Pentium III processor, 256 MB RAM, and dual, mirrored 9.1 GB fixed disk drives. Preferably, each of those application servers $325_1 \ldots 325_n$ may further comprise a Microsoft Windows NT operating system, and the Total-e-Business™ platform, developed by Bluestone Software, Inc., Philadelphia, Pa. U.S.A. (now known as the HP Bluestone Middleware Division of Hewlett-Packard Company), and including the Total-e-Business Server (formerly known as "Sapphire/Web"). Bluestone's Universal Business™ Server, Release 7.0, for example, may be used to manage the system and methods of the present invention, while running on each of the application servers $325_1 \ldots 325_n$. At the same time, Bluestone's Load Balance Broker (LBB) may be loaded on each of the web servers $320_1 \ldots 320_n$, to facilitate balancing of the load of communications between each of the web servers $320_1 \ldots 320_n$ and each of the application servers $325_1 \ldots 325_n$.

When a request within the vending machine management application may be intended for one of the application servers $325_1 \ldots 325_n$, it can go to one of potentially many instances of the application, which may reside on different machines. The task of ensuring that simultaneous requests are distributed evenly across multiple instances, in order to ensure efficient processing, falls to the LBB.

Before one understands how the LBB performs its load balancing, one must first understand its internal storage mechanism (i.e., how information about applications and their instances is stored therein. In essence, the following four fields may be used to store information about all the instances in a specific application: (1) Host: the hostname of the instance, as contained in $SAPPHIRE/config/apserver.txt; (2) Port: the port allocated to this instance, also as contained in $SAPPHIRE/config/apserver.txt; (3) Usage: the number of requests currently being processed by this instance; and (4) Failed: whether or not communication to the host in general or the instance in specific has met with failure. At this juncture, therefore, a somewhat more detailed description of Usage and Failed may be merited here.

Usage is the number of requests that are currently being handled by this instance. It is the primary factor used to ensure that load is balanced evenly. Initially, a count of zero (0) is assigned to the usage field for all instances, because the maximum number of possible requests an instance may process at any given time is limited only by system resources. The usage count is incremented every time a request is passed off to the corresponding instance and is decreased once the request has been processed.

Failed is a flag which, if true (or on), means that communication to the application server instance failed on the last attempt. Initially, the status of this field is set to false for all instances, because it is turned on only if the following sequence of events unfolds: (1) the LBB attempts to contact the instance and fails; (2) the LBB contacts a Dynamic Application Launcher (DAL) on the instance's machine to have the instance started; and (3) the LBB attempts to contact the instance and fails again. Once an instance has been marked as failed, it gets moved to the bottom of the list of instances to ensure that time is not wasted attempting to contact it any time soon. Also, the hostname of the instance gets added to a separately maintained list of failed hosts. Failed instances are ignored during the LBB's instance selection phase.

There are two ways a failed instance can be returned to "active duty" (i.e., its failed status is reset), allowing the instance to be reconsidered for future requests. Each failed instance has a timer that is started when the instance is marked as failed. After a certain amount of time has elapsed, the instance's failed flag is reset. This allows for situations where the communication problem might be temporary in nature. Once an instance is contacted, its hostname is removed from the list of failed hosts and any other failed instances going to the same hostname are also reset. At this point, the assumption is that communication problems tend to be network or server-related (i.e., the entire host machine tends to be down, not just a specific port thereon).

There are two versions of a load balancing algorithm used by the LBB, one for use without session affinity and one with. In the former case (i.e., without session affinity), when a request is received, the entire list of instances is sequentially searched, starting from the first instance in the list and ignoring any failed instances. The entire list of valid instances, then, is searched for the instance with the lowest usage count. If multiple instances have the same low value, the first one found is used. The only time the search ends prematurely is if an instance with a usage count of zero (0) is found. This is because it is not possible to improve upon this usage count and, thus, this instance is used automatically. At this point in time, the usage count of the instance that is used is incremented.

In the latter case (i.e., with session affinity), the usage count of an instance goes up by one (1) every time it is used to process a request. However, when the request is done, the usage count goes back down by one (1). In high load situations where multiple requests are submitted with little time in between, multiple instances of the application automatically handle these requests. However, in situations where the requests are somewhat further apart, the usage count of an instance might have time to go back down by the time the next request comes in, allowing a very small number of application server instances to process all the requests. This works well in cases where there is no session affinity. However, because of the characteristic of session affinity always ensuring the same instance of the application to a particular browser session, it is not prudent to have a small number of application server instances handling multiple requests simply because they are not in quick succession. Toward this end, the LBB has an index pointer into the list of instances in case of session affinity.

When a request comes in and a session cookie is attached (i.e., it is not a first time user), it gets the very same instance which processed the request the last time. There is no load balancing to be performed here. If, however, the request is from a new session, the load balancing algorithm is much the same as without session affinity with a slight modification. The search for the least used application server instance starts with the instance pointed to by the index pointer instead of at the top of the list. Once an instance is used, the index pointer is incremented to point to the next instance in the list, with wrap-around capability, to ensure that the same instance is not bombarded with multiple requests. If a request with a session cookie points to an instance which has failed (or fails at this time) after three retries, the request is treated as if it were a new request and a new session cookie is assigned after load balancing is performed.

There is one primary difference between using session affinity and not doing so as far as load balancing is concerned. Without session affinity, load balancing occurs at each request. The load balancing process with session affinity, however, only occurs at the very first request, since subsequent requests get routed automatically to the same instance every time.

Beneath the layer of web servers $320_1 \ldots 320_n$ and application servers $325_1 \ldots 325_n$ is a storage area network (SAN) 330. SAN 330 generally comprises a cluster server 335 that is connected to receive incoming Internet traffic through each of the application servers $325_1 \ldots 325_n$, and to transmit outgoing Internet traffic through the routers 310 and firewall 315, from the SAN 330 by way of either a file server 340 or a database server 345. File server 110 and database server 111 each may be preferably comprised of a Sun Enterprise™ 420R server (manufactured by Sun Microsystems, Inc., Palo Alto, Calif. U.S.A.). In the case of the former, file server 340 may further comprise a pair of 450 MHz UltraSPARC-II processors with 2 GB ECC memory. Database server 345, on the other hand, may further comprise four 450 MHz UltraSPARC-II processors with 4 GB ECC memory. Accordingly, both file server 340 and database server 345 may run in a Solaris™ operating environment. Database server 345 may also comprise Oracle 8i™, Release 2.

In accordance with an especially preferred embodiment of the present invention, SAN 330 may comprise a fibre channel switched network or fabric. It is known that such networks provide a high-performance, any-to-any interconnect for server-to-server or server-to-storage traffic. Fibre channel switched networks combine the characteristics of traditional networks (e.g., large address space, scalability) and I/O channels (e.g., high speed, low latency, hardware error detection) on a single infrastructure. Additionally, fibre channel switched networks facilitate multiple protocols for networking (e.g., IP), storage (e.g., SCSI) and messaging (e.g., VIA) over a single infrastructure. This infrastructure may easily be used to create SAN 330, in which peripheral devices such as disk storage 350 and tape libraries 370 can be attached to the network and shared among attached nodes. Some of the desirable features of this manner of organizing the servers and storage of the invention described herein follow.

Fibre channel fabrics such as SAN 330 may suitably provide a switched 100 Mbytes/second full duplex interconnect. In addition, block-level I/O may be handled with remarkable efficiency compared to networking traffic. A single SCSI command can transfer many megabytes of data with very little protocol overhead, including CPU interrupts. As a result, relatively inexpensive hosts and storage devices can achieve very good utilization and throughput on the network. SAN 330 may also use a 24-bit addressing scheme, thereby permitting 16 million devices to be addressed. SAN 330 may further comprise a pair of cross-connected SilkWorm™ fibre channel switches 355 (manufactured by Brocade Communications Systems, Inc. San Jose, Calif. U.S.A.).

Traditional storage interconnects are limited in the length of cable that can attach hosts and storage units. Fibre channel allows links up to 10 kilometers, which vastly increases the options for the server administrator. SAN 330 allows a number of servers to utilize sections of SAN-attached storage devices. This allows for cost efficiencies that come from purchasing storage in large units. In addition, this arrangement makes it possible to ensure consistent quality and support across the entire server population. Externalizing the storage from the server makes it a first class asset in its own right. Servers can now be upgraded while leaving storage in place. Storage can be added at will and dynamically allocated to servers without downtime. Because the SAN 330 may be extensible, it allows incremental deployment of features such as fault tolerance and hot backup sites.

In a presently preferred embodiment, cluster server 335 may comprise a Veritas Cluster Server™ (developed by Veritas Software Corporation, Mountain View, Calif. U.S.A.). File server 340 and database server 345 may be redundantly configured. That is, in the event that either of the servers goes down during a session, the other can assume control of that session with the assistance of the cluster server 335. VERITAS Database Edition™ for Oracle®/HA may, alternatively, be used. As a result, the database service may be composed of one or more logical network addresses (e.g., IP), RDBMS software, an underlying file system, a logical volume manager and a set of physical disks being managed by the volume manager. If this service, typically called a service group, needed to be migrated to another node for recovery purposes, all of its resources must migrate together to re-create the service on another node. A single large node may host any number of service groups, each providing a discrete service to networked clients who may or may not know that they physically reside on a single node.

Service groups can, thus, be managed to maintain service availability through an intelligent availability management tool. Given the ability to test a service group to ensure that it is providing the expected service to networked clients and an ability to automatically start and stop it, such a service group can be made highly available. If multiple service groups are running on a single node, then they must be monitored and managed independently. Independent management allows a service group to be automatically recovered or manually idled (e.g., for administrative or maintenance reasons) without necessarily impacting any of the other service groups running on a node.

At the most basic level, the fault management process includes monitoring a service group and, when a failure is detected, restarting that service group automatically. This could mean restarting it locally or moving it to another node and then restarting it, as determined by the type of failure incurred. In the case of local restart in response to a fault, the entire service group does not necessarily need to be restarted; perhaps just a single resource within that group may need to be restarted to restore the application service. An agent typically monitors application services, which is a small, application-specific fault management program. Given that service groups can be independently manipulated, a failed node's workload can be load balanced across remaining cluster nodes, and potentially failed over successive times (due to consecutive failures over time) without manual intervention.

Application servers $325_1 \ldots 325_n$, in concert with the web servers $320_1 \ldots 320_n$, file server 340, database server 345, and the vending machines 105, provide a conventional three-tiered architecture. As with similar such three-tiered architectures, application servers $325_1 \ldots 325_n$ handle most of the application processing, such as business logic processing and database integrity processing. The vending machines 105 only handle interface processing, while the file server 340 and database server 345 only handle database processing.

As seen in FIG. 3, the hardware comprising the ASP means 200 of system 100' may be substantially completed with the addition of high-availability storage 350 cross-connected to the file server 340 and database server 345. One suitable such high-availability storage 350 comprises the fibre channel switches 355, a pair of disk controllers 360, and a pair of disk arrays 365. Each of the disk controllers 360 may comprise a SCSI controller (e.g., a Symbios® SYM53C1010 Ultra160 SCSI controller, manufactured by LSI Logic Corporation, Milpitas, Calif. U.S.A.). In one embodiment, the disk arrays 365 may each comprise twenty 36 GB LVD (i.e., low voltage differential) disk drives which are configured to be mirrored RAID 5. Suitable such LVD drives are, for example, the Ultrastar 36 ZX hard disk drives manufactured by IBM Corporation, Armonk, N.Y. U.S.A.

The ASP means 200 of system 100' may further comprise a tape library 370, which includes a plurality of advanced intelligent tape drives 375 (preferably AIT2 tape drives) and a plurality storage positions 380 for the AIT2 tapes. In one embodiment, the tape library 370 may comprise a TLS-4000 automated tape library (manufactured by Qualstar Corporation, Canoga Park, Calif. U.S.A.), which can incorporate up to 12 AIT2 tape drives and has storage for at least 60 AIT2 tapes. Such tape library 370, may furthermore comprise suitable software (e.g., Veritas Netbackup™) to control reading and writing of data to the tape library 370.

Figure 4:
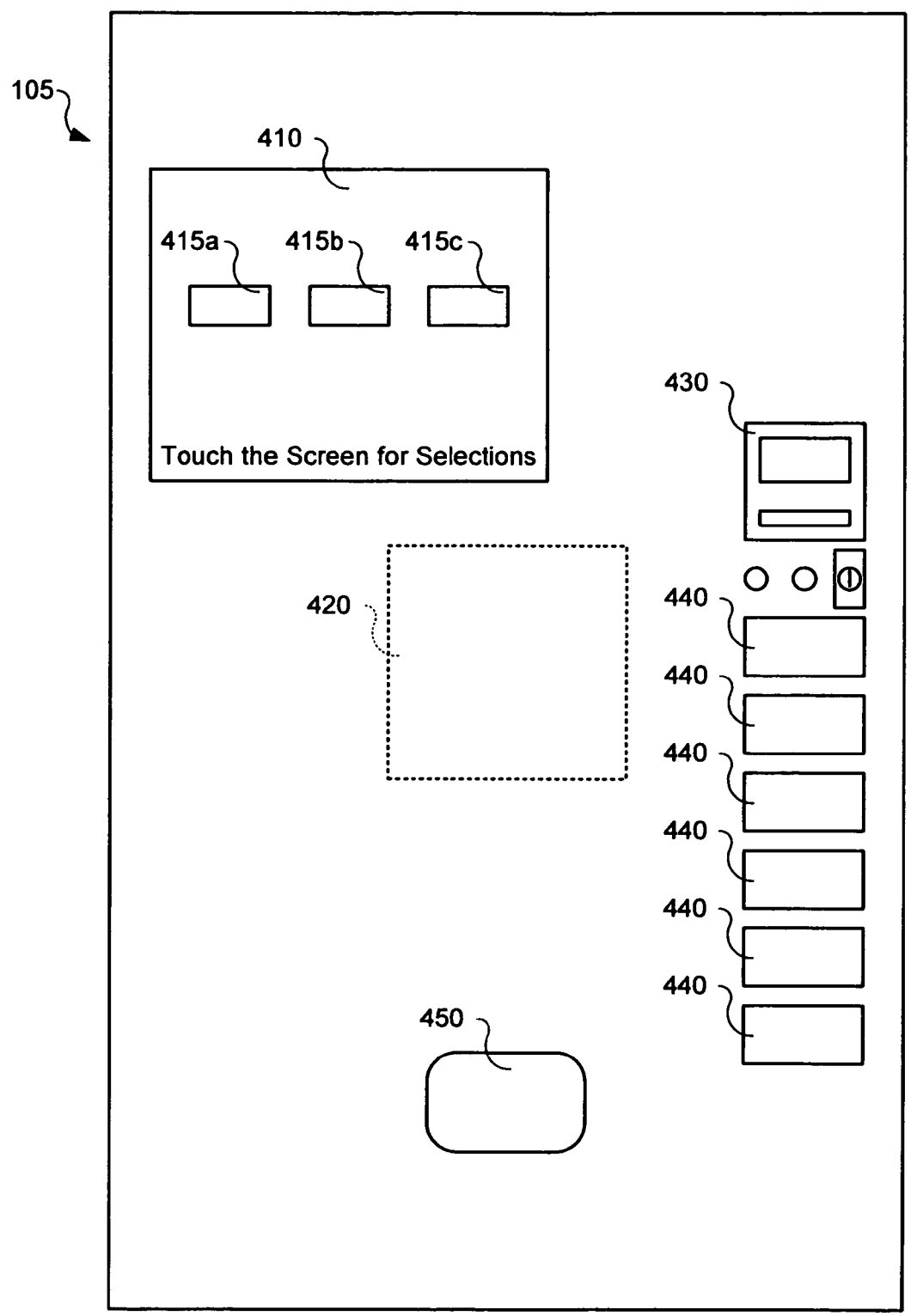
FIG. 4 depicts a vending machine according to one embodiment of the present invention.

Referring now to FIG. 4, details relating to the vending machines 105 according to the present invention will now be described. Vending machines 105 used in the multimedia system 100 and 100' generally comprise a computer-based control system using a touch screen interface to: (a) select categories of items from which to purchase; (b) select specific items to purchase from those categories; and (c) select methods of payment for such purchases (e.g., cash/coin, credit/debit, or charge-to-room). Vending machines 105 according to the present invention may also be adapted to facilitate the selection of multiple items (e.g., potato chips, soda, and a sundry) and subsequent payment by way of the selected method of payment in a single transaction.

The movement from physical currency to cashless payments is becoming more prevalent as advancements in automated banking, account management and innovative reconciliation systems gain in popularity. Basically, a cashless payment system is dependent upon specific instructions governing the transference of funds from one account to another. The instructions can be paper-based (e.g., personal check or voucher system), or electronic (e.g., credit and debit magnetic stripe or RFID), or stored value (e.g., prepaid or stored value smart card). It is important to note that these categories are not mutually exclusive. For example, the innovative MasterCard® PayPass™ (a trademark of MasterCard International Incorporated) card features a contactless RFID payment option while also supporting a magnetic stripe for credit card settlement.

Basically, there are three components involved in a cashless vending application. First, there is the front-end device that serves as an activation point and consumer interface (e.g., card swipe, radio receiver, etc.). Next, there may be hardware and software necessary to capture and/or authorize the transaction (e.g., modem, database link, etc.). Third, there is a back-end system responsible for data capture for subsequent settlement and/or transference to vending management software. Data transfer standards provide specifications for electronically storing data in vending machines by describing the structure and content of specific data fields, methods of interfacing retrieval devices, a physical interconnect and a communication protocol. The technical standards governing vending machine operation are multi-drop bus (MDB) and data exchange (DEX). MDB standards provide for execution of the transaction, effective monitoring, auditing, reconciliation and settlement operations for cashless transactions while vending management software applications are dependent on DEX standards.

A more recently developed vending machine technology standard than DEX is the MDB standard. Vending machines have one master communication channel and it is labeled the vending machine controller (VMC). The role of the VMC is to define the functionality of peripheral equipment (i.e., coin changer, bill validator, card reader, etc.) that must be interfaced with the electronic circuitry of the machine to work properly. MDB is the short form of multi-drop bus/internal communication protocol or MDB/ICP. The MDB/ICP is an internationally supported interface. Through the cooperative efforts of the National Automatic Merchandising Association (NAMA) in the United States and the European Vending Association (EVA) and the European Vending Machine Manufacturers Association (EVMMA) in Europe, the standard was developed with provisions for varying currency acceptance and payment technologies.

The MDB standard defines a serial bus interface for electronically controlled vending machines. It also standardizes vending machines that employ electronic controls so that all vending and peripheral equipment communicate identically. Further details regarding MDB may be found in Multi-Drop Bus/Internal Communication Protocol, Version 3.0 (Mar. 26, 2003), which is incorporated as if more fully set forth herein.

Basically, MDB defines the serial bus interface for electronically controlled vending machines. It also standardizes vending machines that employ electronic controls so that all vending and peripheral equipment communicates with each other (i.e., vending and peripheral equipment communicate identically). The serial bus, or MDB, is configured for master-slave operation.

There is one master with capability of communicating with up to thirty-two peripherals. The master is the VMC. The purpose of MDB is to ensure that the necessary functionality of any device on the bus (i.e., interfaced peripheral equipment) is compatible with the capabilities of the VMC. In other words, the software of both the peripheral and VMC must be compatible, but not necessarily at the same level of capability in order for the peripheral function properly.

Within the MDB standard, the functionality of each peripheral is described as a Level number. A change in Level denotes that some additional functionality of the peripheral has been implemented. For each peripheral device there are sets of mandatory functions to which all equipment developers must adhere to ensure compatibility. It is a fundamental principle of the MDB standard that all implementations must guarantee the backward and forward compatibility so that VMSs and peripherals always work at the highest common level.

Levels of peripheral functionality were established when a major change occurred in the peripheral that added extended commands and responses. Due to potential conflicts between a VMC level and a peripheral level, neither the VMC nor the peripheral should issue a command or reply with a response that is not supported by the other device. For example, connecting a Level 2 MDB device to a Level 1 VMC is incompatible and therefore the payment device will not function properly. The current level for the MDB standard is referred to as Version 3/Level 3, and continues to incorporate necessary monitoring features associated with cashless transactions. In addition, Version 2 of MDB/ICP also contains a File Transfer Layer (FTL) for all devices. The FTL permits the VMC to transfer files via the MDB/ICP bus between peripherals without the need for the VMC to take action (as was the case previously). The implementation of the FTL in VMC software allows additional functionality between peripherals without the need for an update of the VMC software.

The VMC must initially determine the level of a peripheral before determining which commands it can issue to that device. A VMC must only send commands that are supported by the peripheral. For example, a Level 3 command may only be issued for a Level 3 or higher peripheral and must not be issued for a Level 1 or 2 peripheral. A cashless payment peripheral learns the Level of the VMC through a setup command and the devices must be compatible to function.

Historically, the manufacturer of the components being placed into a vending machine had to define its technical functionality to various machine components. Since each component manufacturer acted independently, a number of proprietary device interfaces emerged. The problem with a proprietary interface is that its uniqueness adds unnecessary costs and complexity to vending machine design and configuration. The MDB/IPC standard was adopted to establish a communication method that allows all the devices in a vending machine to use a common interface. Many devices can tie into the same interface and still work independently of all the other devices on the interface. Since each interfaced devices is assigned an address, the VMC can determine which device is active and communicating.

MDB/ICP enables the VMC to determine what coins the coin changer accepted; what bills were accepted by the bill acceptor; and how much credit is available through the card reader. It is a way for the controller to direct the coin changer how much change to pay out; or the card reader how much credit to return to the card. There are additional peripheral devices, beyond the coin changer, bill acceptor and card reader, which the VMC can communicate to through the MDB interface. Vending machines that support the MDB/IPC standard allow a vending operator to choose payment and other devices based on reliability, performance and price.

Since the MDB/JIPC standard establishes the manner by which each component device communicates with the VMC, the connection to each device is identical. Every device has basically two MDB/IPC connectors to allow it to both connect to the MDB/IPC bus in the machine and provide a connection for another device. This design reduces the number connectors needed as well as allowing for one more device. When a new device adheres to the standard, the hardware and connectors to add the device are already in the machine. In many cases a software update allows the vending machine to support the device.

Technically, the MDB/IPC standard defines a serial master-slave communication bus used by the internal devices in the machine, like the coin acceptor. MDB allows for instantaneous updating of the current status of the machine (i.e., data changes as each product is sold). It is for this reason that the MDB standard is considered a transaction-based mechanism, unlike DEX, which is a cumulative-based reporting system. The MDB protocol allows for the attachment of an audit (DEX) device that, acting as a passive slave, receives information of all events that happened on the machine (e.g., vends, sold outs, coins and bills accepted, etc.).

On the other hand, DEX involves the retrieval of stored information (a snapshot) through a serial plug designed for connectivity with a handheld terminal (HHT) or small PC. The connection conforms to the EVA -DTS standard and provides access to status data, testing routines and machine setup. In a DEX connection, the connected device actively polls the machine for stored information.

Cashless transactions are not dependent on DEX but rely on MDB processes. The fundamental difference between DEX and MDB is that MDB is the only method for a bill acceptor or a coin changer to report credit deposited to authorize a vending transaction. DEX cannot do this. This fact makes it necessary to have MDB installed; DEX, while needed for sales reporting, is not mandatory for the machine to operate. Hence, from a cashless payment perspective, MDB is more useful than DEX since it details the transaction (e.g., card number, transaction value, product(s) sold, date and time) for reconciliation. The results of the transaction will be posted as an MDB record. For operators not employing cashless vending, DEX data is often sufficient to provide necessary information for a vending management system. It is for this reason; some vending operators only use MDB for cashless transactions and ignore DEX data. For those operators desiring DEX data, a DEX cable can be used to transfer the DEX file along with the cashless MDB data.

Historically, NAMA established a communication protocol (DEX) for the electronic retrieval of machine-level transactions via data polling. DEX is an acronym for Data Exchange and is the abbreviation for DEX/UCS denoting Data Exchange Uniform Code Standard.

DEX is the key to technological advancements in the vending industry worldwide as it enables data capture at the point of purchase. DEX has earned international recognition and support and can be used to facilitate consistent data formatting throughout the vending channel. In the past, machine manufacturers varied in how data exchange transmissions occurred. In response, DEX designers and equipment engineers have established standards governing data recordation, file formatting and file exportation through common interface linkages. As a consequence, vending machines are manufactured as DEX-enabled and are often labeled "DEX-compliant." From a sales perspective, DEX provides the vending operator the ability to track brand and/or product preferences at the point of purchase. DEX has been found to improve sales performance, reduce operating expenses and minimize machine malfunctions.

In addition, DEX enables space to sales analysis, for machine-level column allocation optimization, in vending management software. This is an important outcome of a DEX-compliant device. The main benefit of line item tracking is accountability and machine plan-o-gram (i.e., rotating menu of product offering) development.

The fact that vending equipment tends to be strategically placed in disparate locations presents a challenge to efficient replenishment, sales analyses, malfunction notification and comprehensive audit reporting. Fortunately, machine-level transactional data can be captured through an electronic control board installed within each vending machine. Aggregating machine-level data enables remote review of transactions and inventory without having to have a physical presence at the machine. The fact data can be exported to a remote warehouse, central office, or product fulfillment center extends the opportunity for more thorough, immediate and frequent analysis. A majority of v-commerce applications are the result of DEX implementation.

In the past, machine manufacturers varied in how data exchanges and transmissions occurred. Recently released DEX software (i.e., Edition 6 and higher) tightens the specifications of the protocol to prevent possible misinterpretations in accountability or brand identification. Since there has been a proliferation of diverse vending products and several variations in the packaging of the same product, the DEX standard has been refined to acknowledge and differentiate between product offerings. While not all vending operators demand identical informational output, vending machine circuit boards are built to possess similar data collection capabilities to ensure the delivery of consistent content. For example, three data elements referenced in the DEX standard are: (a) number of bills held in the bill stacker; (b) quantity and denomination of coins stored in the coin box; and (c) number of vends or products sold.

A DEX-compliant machine relies upon DEX architecture to enable vending machine polling. The vending machine exports its unique identification number and stored data to an external system for analysis and processing. An optional element of this data stream is the machine's service history, including the last date the machine was serviced. Once DEX data is exchanged with a vending management system various transaction audits can be performed. Since captured data is not accessible or editable prior to interfacing to an auxiliary system, cash accountability will be accurate and complete. Also, the ability to track product information at the machine-level enhances productivity, as machine fulfillment is improved and manual data entry eliminated. The DEX protocol enables different makes and models of vending machines to communicate in a consistent manner. DEX data sets include sales mix, cash collection, product movement and malfunction alerts. Additionally, DEX specifications may soon include a standard for reporting error codes for payment validation, dispensing jams and other operational problems. Proposed specifications are pending approval.

Since vending machines have an average life of ten years, it may take a generation of new machine installations to fully realize the DEX potential. Basically, DEX provides an indisputable, auditable accounting method for cash collections, units sold and product price recordation that capable of enhancing route efficiency and improving warehouse operations. For example, how much cash should be in a machine at the close of a sales period? A route driver, unable to view the DEX electronic record, will have cash collections compared against the machine-level electronic record. Balancing cash against collections provides management with a unique level of information and control.

NAMA and the EVA have jointly adopted a communication protocol for the electronic retrieval of machine-level information via data polling. As a consequence, vending machines are now manufactured as DEX-enabled. Each vending machine is given a unique identifying number by which the DEX data extracted is labeled.

During a polling session, this unique number and the date and time that the service occurred, are transmitted to the polling device. DEX data is polled an audit can be performed. Since captured data is not accessible or editable by the route driver, cash accountability is assumed accurate and complete. Also, the ability to track product information at the machine level enhances productivity as route time is improved and manual data entry is eliminated. DEX specifies a data format to enable all different types of machines and machine models to communicate electronically in a similar manner. The DEX information available includes: sales, cash collections, product movement and other vending machine activities. Additionally, the DEX specification contains a standard for reporting error codes for payment validation, jams and other operational problems. Line item tracking is important to both accountability and assistance in future machine menu development. DEX data retrieval can be accomplished via three distinct polling modes: (a) 1-local polling; (b) 2-dial-up polling; or (c) 3-wireless polling.

Local polling incorporates a hand-held device or pocket probe designed to plug connect to a vending machine's DEX-port or to communicate through an IR port. Once the connection is established, the device is used to extract or upload transactional data from the machine to the handheld device. A typical DEX data upload takes approximately five seconds. Field collected data can be transferred from the handheld device to a central office computer (i.e., downloaded) for processing, analysis and report generation.

Dial-up polling involves use of a modem and telephone line. Once a valid connection is established, DEX data can be transported to a remote office or warehouse location for evaluation over an Internet or virtual private network (VPN) connection. This design enables the machine to be remotely monitored with respect to cash, inventory and machine malfinctions.

Similar to dial-up polling, wireless polling enables remote access to DEX data via a network. Wireless polling however relies upon network connectivity to establish the proper linkage. The advancement of wireless technology has emerged as an attractive alternative. Wireless applications possess tremendous potential for the vending industry, an industry that desires mobility, flexibility and reliability in enterprise-wide operations. Vending practitioners dissatisfied with the constraints and complexities of hard wiring are migrating to the convenience of design portability and user mobility that wireless technology solutions provide.

Common network connectivity options include both the Internet and virtual private networks (VPN). The Internet is a public network that presents connectivity challenges based on the architectural structure surrounding the vending equipment combined with strength of signal requirements. Connectivity to a VPN is more direct and less susceptible to structural infringements but tends to be more costly. Vending operators are benefiting from such devices as hand-held terminals, personal digital assistants, smart paging units, global positioning systems, telecommunication links (i.e., telemetry), proximity transponders and related techniques.

Referring again to FIG. 4, it can be seen that a vending machine 105 according to the present invention generally comprises a touch screen display 410, a VMC 420, acceptor/validator means 430, a plurality of chutes 440 for display and vending of items for sale, and a dispensing area 450 for receipt of the items purchased.

Ideally, operators seek a cashless solution that can be completed in the same time (or faster) than a cash sale. A cashless system may rely on telecommunications to obtain transaction approval. In the case of cashless vending, operators have the option of trying to secure an authorization for each sales transaction as it occurs (i.e., real-time) or, for lower value transactions, offsetting some of the security of full authorization in order to offer consumers faster transactions by using local authorization and then transmitting transactional data at a predetermined, later point in time (i.e., batch processing).

There are a variety of card products that can be used to complete cashless vending transactions. Nearly all cards contain a magnetic stripe (e.g., credit card, identification card, prepaid card, etc.) but some may also possess an embedded integrated circuit (IC) chip (e.g., smart card). Credit cards, debit cards, prepayment cards and smart cards are the more obvious media; but there are also hotel room key cards, employee ID cards, student ID cards, e-gift cards and a variety of specialty account cards (e.g., corporate program cards and loyalty program cards). Each of those cards may be used with vending machines 105 according to embodiments of the present invention, as long as the acceptor/validator means 430 is suitably configured.

From a cardholder perspective, a credit card account represents an established credit line against which payments are deferred through creation of a loan from a sponsoring financial institution. There are three general types of credit cards: (a) bankcards; (b) travel and entertainment cards; and (c) proprietary cards. A bankcard is issued by a bank based on the credit rating of the applicant. Bankcards include Visa, MasterCard and Discover cards. Travel and entertainment cards are issued by private companies and may not offer installment payment programs, like credit cards. Examples of travel and entertainment cards are American Express and Diners Club. Proprietary credit cards are issued by a private entity and are limited in negotiability. For example, a chain store (e.g., Sears) or hospitality company (e.g., Holiday Inn) may issue its own credit cards and therefore also serve as its billing and collection agency.

To the vending operator, a credit card purchase represents a deferred payment process that involves processing and handling fees. The reason for accepting credit cards is that customers tend to spend more when a credit card is tendered, as opposed to cash. Incremental increases in sales with credit cards are generally sufficient to offset the associated processing discount fees. No-signature-required credit card transactions do not require a customer receipt. Cashless vending suppliers caution operators that receipt printers can be problematic and should be avoided wherever possible.

From a technical perspective, there are three tracks on the magnetic stripe of a standard credit card. Each track is about one-tenth of an inch wide. A credit card issuer typically uses tracks one and two, while the content of track three is not standardized. Proper processing requires electronic data capture (EDC) in that the card reader must be able to decipher and collect track data.

Basically, there are three types of debit cards: (a) ATM-cards; (b) check-cards; and (c) combination (i.e., ATM and check) cards. The word debit means to subtract. A debit card purchase thereby initiates a transaction in which the value of the transaction is subtracted from the cardholder's account balance and transferred to the retailer. An ATM-card, which requires a personal identification number (PIN), initiates an online transaction that leads to immediate account posting and subsequent funds transfer while a check-card purchase is an off-line transaction with a deferred account debit and delayed funds transfer. In contrast to a credit card, no loan is involved in the transaction. As a general rule, a PIN is required for debit card authorization; however, this is not the case for vending applications, as there typically is no PIN-pad supported by the vending machine.

A smart card may be used as a credit/debit card or as a stored value card that features an embedded microchip laminated onto its surface. A stored value smart card functions similar to a debit card in that the amount on the card is diminished as purchases are applied against the card's value. Generally, a stored value smart card contains information necessary to identify the cardholder and its value therefore eliminating the need for external authorization. PIN codes are typically used to access information stored on the chip. Some smart cards can be revalued at a vending machine, over the phone, ATM terminal, or via electronic banking. A combination card contains both an integrated circuit (IC) chip and a magnetic stripe for alternate processing. Combination cards are the most popular and useful.

Proprietary magnetic stripe cards are widely used; hotel room keys, student ID cards (e.g., access to meal plans), prepaid cards, e-gift cards and related forms of settlement are also representative of cashless payment options. Customized magnetic stripe cards, also called junk cards, can be developed on a proprietary basis and adopted for vending machine application. Hotel room keycards can likewise be adapted, although interfaces to hotel property management systems are generally complex and present a deferred cash flow as the hotel first collects payment from its guest and subsequently pays the vending operator. Some prepaid cards are labeled single use and are discarded once their value is exhausted. This form of card typically does not have a PIN code and works no matter who has it in their possession. More sophisticated cards are reloadable, meaning the card's value can be replenished or increased (i.e., reloaded) at cash-to-card terminals or through account transfer. An e-gift card is replacing the traditional paper certificate with a magnetic stripe card or a stored value card.

RFID is an acronym for radio frequency identification, which is a combination of a computer chip and a tiny antenna that allows the chip to wirelessly communicate with a receiver. As RFID technology continues to increase in popularity, the hospitality industry can expect an influx of innovative forms of cashless and wireless settlement. RFID, which is expected to replace bar codes as an on-product identification tag, is quickly gaining traction as a favored form of settlement. Similar to the technology used to monitor prepaid toll roads, various hospitality firms are experimenting with linking an RFID device to a customer account for deferred settlement. In a cashless transaction scenario, the RFID transponder communicates a unique purchaser identifier code to a POS receiver. Basically, the hospitality business integrates an RFID system with its POS system to integrate credit and debit account transactions.

Radio frequency devices employ low-power radio waves to transmit signals. There are many standards for RF networks, but a popular format is IEEE 802.11b, commonly referred to as Wi-Fi. Wi-Fi networks transmit data using low-power microwaves. Wi-Fi devices are capable of speeds of up to 11 mbps. A typical RF network contains one or more wireless access points and one or more devices that have an RF network adapter. The wireless access point can be connected through a physical medium to an external network for eventual settlement. In an RFID scheme the account holder creates a link between the transponder and a credit or debit card account to establish a payment plan. When a purchase transaction takes place, the amount of the transaction is applied to the account. In addition, some RFID transponders are being developed with the capability to also have a built-in microchip for stored value transaction settlement as an alternative to linking to credit and debit card accounts.

An RFID transponder allows a customer to pay by waving an electronic wand or embedded card near a target spot right above the bill acceptor. RFID systems can be programmed to automatically deduct money for purchases from a prepaid account or charge the sale to a linked credit card account and can sometimes be used in non-vending foodservice. For example, RFID transponders imbedded into key chains have been tested by Canteen in Boise, Id. In addition to Canteen vending, the key chains were accepted at local McDonald's restaurants. Overall, most operators have found that RFID settlement increases sales since payment procedures are greatly simplified.

M-commerce involves a customer activating a vending machine using a mobile phone. Part of the challenge facing m-commerce for vending in the United States is the fact that there are a plethora of wireless carriers each with different hardware protocols. When m-commerce is invoked, the vending operator will experience a deferred payment scheme as monies will be collected by the phone company and subsequently transferred to the vending operator. Non-cash collections might well necessitate changes in route accountability and revenue tracking.

The vending machines 105 according to embodiments of the present invention may be adapted to all such cashless payment systems as outlined above.

The term "open system" in relation to a cashless payment plan refers to a scheme in which a purchase transaction can be recorded, processed and reconciled without proprietary settlement technology. An example of an open system transaction is a credit card purchase.

When a credit card is used as payment, the card is swiped, authorized and processed without the use of in-house application software. The term "closed system" describes a situation in which unique application software is required to process a non-cash transaction; a closed system is usually defined by its environment (e.g., prison, institution, factory, etc.). A closed system may be used to monitor and track internal transactions. In addition, with a closed system it is possible to restrict transactions, account balances and purchase frequency through a central authority or account. It is important to note that an operator can participate in both open and closed systems simultaneously. In other words, to accept a major credit card that also happens to have an embedded chip (smart card) or RFID settlement option available.

Cashless has and continues to be successful in closed environments. Closed systems, aside from providing fast transactions and enhanced security, also allow vending operators to offer employee bonuses in the form of purchase discounts. Advances in telemetry hardware and software provide a basis for innovative cashless vending applications. Where cashless systems were once confined to "closed" networks that utilize magnetic strip cards that transfer stored value, new telemetry technology allows "open" networks, whereby consumers charge their purchase to a bank debit or credit card. Growth in cashless is also being driven by remote data polling. Some industry observers have commented that because telemetry is important to the development of cashless vending, it is difficult to discuss cashless transactions without including "intelligent vending." Cashless vending is expected to drive intelligent vending and to lead vending operators to discover benefits of telemetry, including polling line item sales and machine malfunctions via a remote computer.

"Online systems" require an always "on" communication network. "Offline systems" that handle credit and debit cards, need only connect on an occasional basis, typically once per day; usually during the nighttime. An offline system may involve an account balance residing in the reader or payment media. With this type of systems, the transaction is completed entirely inside the reader and does not require external communication linkage. It is for this reason that an offline system is often referred to as a stored value system. In an online system the account balance is contained outside the reader in a central database. The transaction is completed between the reader and the database. Since an offline system requires some form of payment media to be distributed to the user, it is almost exclusively used in a closed environment. By contrast, an online system only needs to identify the user and the database engine will determine the appropriate settlement mechanism. Hence, an online system can support both open and closed environments at a single location.

From a customer perspective, either open or closed systems can support a frequent purchaser, reward, or affinity program. With individual customer accounts, it is possible to create a data warehouse integrated to frequent purchaser software to form a loyalty program. In addition to analyzing the properties of all transactions, companies are able to apply data mining to generate many important findings (e.g., peak sales periods, effective staffing, product bundling, etc.). For operators, in addition to revenue enhancement there can be much gained from captured transactional data (sales by product, preference data, day part data, etc.).

Closed environments include college campuses, onsite foodservices, transit systems, corporate cafeterias, restaurant chains and special events, fairs and festivals. As will become more apparent from the following detailed description of the vending machines 105 according to embodiments of the present invention, they may be adapted to both open and closed environments as outlined above.

Figure 5A:
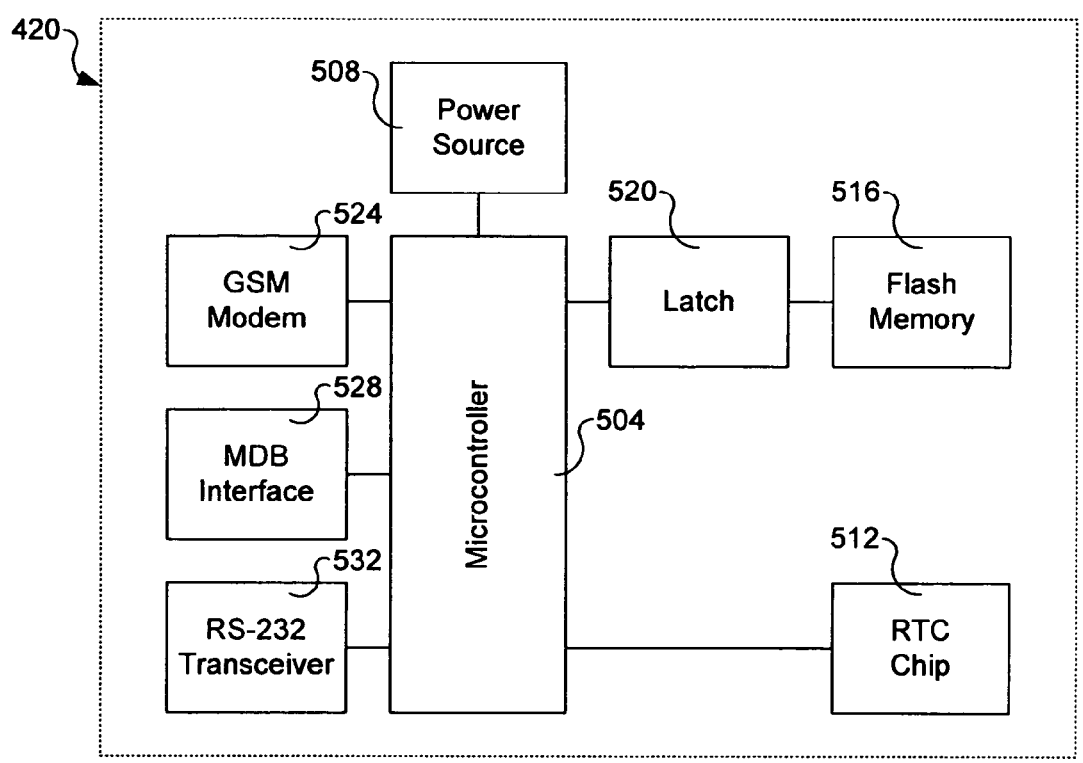
FIG. 5A depicts in greater detail the vending machine controller shown in FIG. 4.

Referring again to FIG. 4, in conjunction with FIG. 5A, it can be seen that the vending machines 105 according to embodiments of the present invention include a plurality of touch screen selection points 415a, 415b, and 415c within which a selection can be made from a simple menu displayed on the touch screen display 410. This menu enables a purchaser not only to select items to be bought, but also to select the method of payment for such selections.

For example, the first screen to be displayed on the touch screen display 410 may be a screen for selecting the item(s) to be purchased (e.g., snacks, beverages, frozen items, hot foods, alcoholic beverages, sundries, etc.). Once the purchaser has touched one of the plurality of touch screen selection points 415a, 415b, and 415c, a second screen displaying a plurality of individual items within those categories, together with a second level of touch screen selection points 415a, 415b, and 415c corresponding to those individual items will be displayed. When an item has been selected by the purchaser by touching one of the second level touch screen selection points 415a, 415b, and 415c, a shopping cart (not shown) with that item will be displayed within the touch screen display 410.

The shopping cart will also contain a third level of touch screen selection points 415a, 415b, and 415c. One of those third level touch screen selection points 415a, 415b, and 415c will provide the purchaser with the option to checkout. Another will provide the purchaser with the option to select another item. If another item is selected by the purchaser, that item will be added to the shopping cart, and means will be provided to display all items within the shopping cart on touch screen display 410.

Once all selections have been made, the purchaser will be provided with a display of fourth level touch screen selection points 415a, 415b, and 415c. Those fourth level touch screen selection points 415a, 415b, and 415c will provide the purchaser with the option of selecting a method of payment, such as cash, credit card, or charge-to-room. Of course, many other forms of cashless payment systems as described herein before may be used in other embodiments of the present invention.

For cash payments, the acceptor/validator means 430 may comprise a bill acceptor which may be capable of accepting only a predetermined number of bills (e.g., only $1 and $5 bills). Suitable such bill acceptors may be the BillPrO™ or MagPro™ series acceptors manufactured by Coinco® (a registered trademark of Coin Acceptors, Inc., St. Louis, Mo.). The vending machine 105 may be suitably programmed to provide a notice on the touch screen display 410 that "NO CHANGE IS PROVIDED". In that case, if the amount entered is greater than the amount required, a credit flag and message may be subsequently displayed to allow the purchaser to return to the selection process to buy whatever the purchaser can to use up the balance. As an example, the purchaser may insert a $5 bill into the acceptor 430 for a $2 item. The vending machine 105 will then display the selection menu to permit the purchaser to select other items until the $3 balance has been spent.

For credit card purchases, the acceptor/validator means 430 may suitably comprise an e-Port® (a registered trademark of USA Technologies, Inc. of Malvern, PA) device. The purchaser may be prompted to insert/swipe their credit card and enter validating information such as their billing ZIP code. Minimum charges may apply. For charge-to-room transactions, the purchaser may be prompted merely to insert their magnetic room key or simply enter their room number and PIN on the touch screen display 410. For all purchases, the vending machine 105 may be adapted to prompt the purchaser to cancel or exit the transaction before completing the vend.

Referring now to FIG. 5A, further details regarding the VMC 420 will now be described. VMC 420 generally comprises a microcontroller 504 powered by a power source 508 and clocked by a real-time clock (RTC) chip 512. The microcontroller 504 is controlled by a program contained in flash memory 516 by way of a buffered, tri-state latch 520. Also coupled to the microcontroller 504 is a GSM modem 524, an MDB interface 528, and an RS-232 transceiver 532. In such a manner, two-way wireless communications can be achieved between the vending machine 105 and either the enterprise control center 130 or ASP means 200.

Figure 5B:
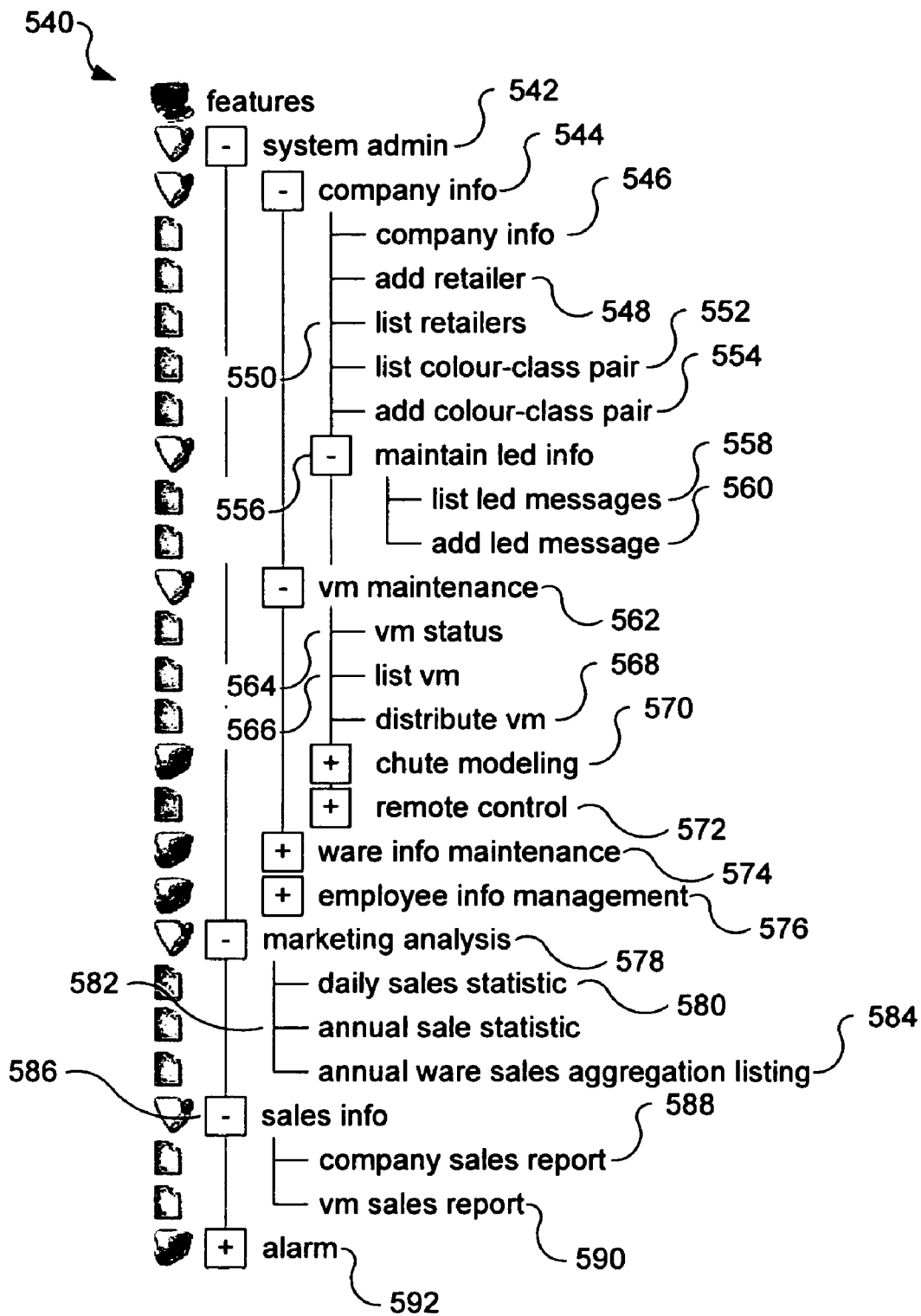
FIG. 5B depicts a file manager for controlling the systems and methods according to the present invention.
Figure 6:
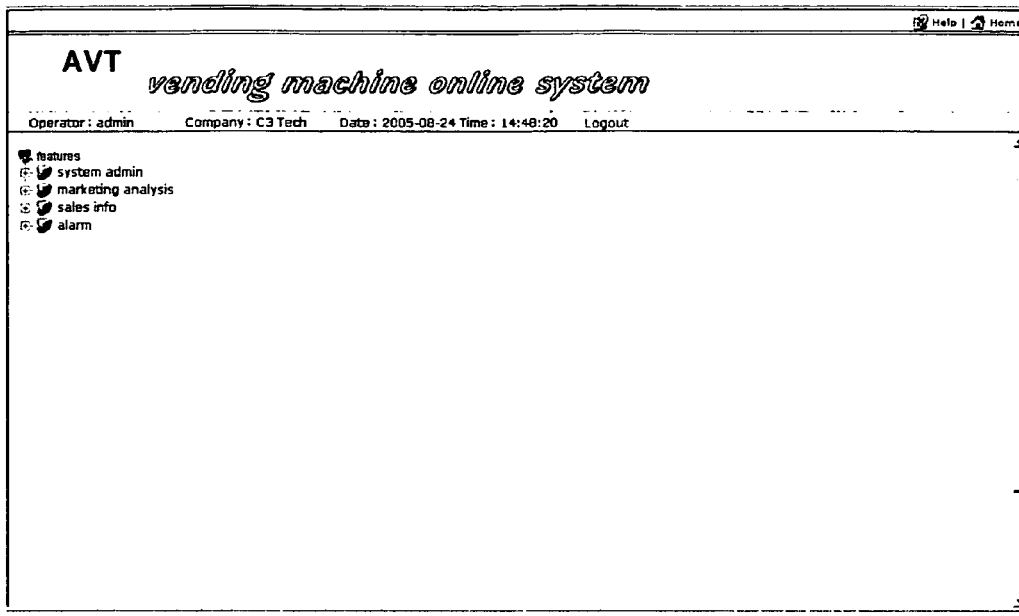
Figure 7:
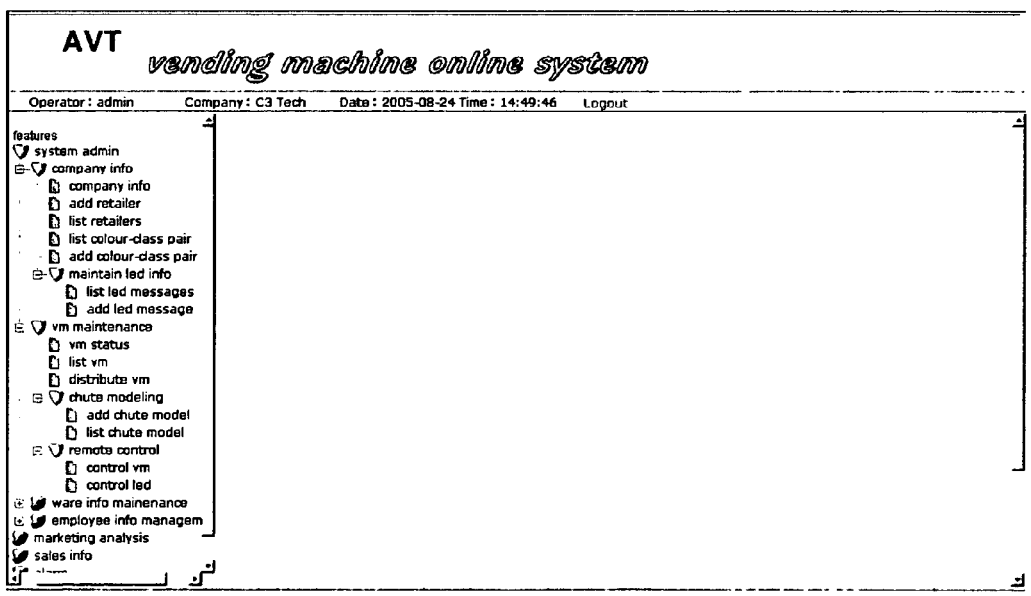

Referring now to FIG. 5B, there is shown a file manager 540 including a hierarchical listing of a plurality of folders, which correspond to a plurality of folders and/or files for generating graphical user interfaces as further depicted in FIGS. 6 through 54. FIG. 6, for example, depicts a top-level view of the file manager 540 with a plurality of top-level folders 542, 578, 586 and 592 entitled "system admin","marketing analysis","sales info" and "alarm",respectively. By clicking on the plus icon next to each top-level folder, the contents of that folder is then displayed as a plurality of folders and/or files as shown in FIG. 7.

Figures 8, 9:
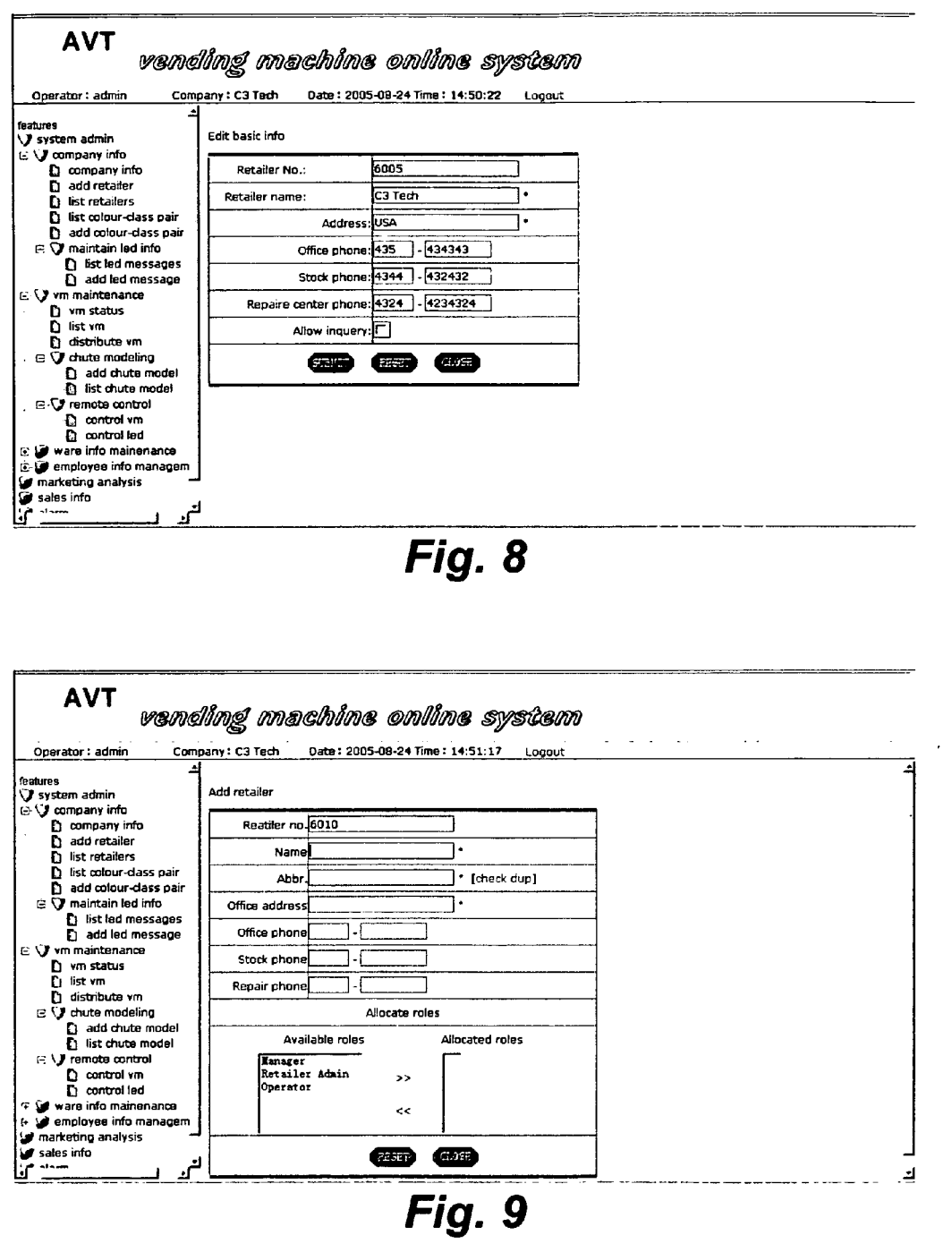
Figures 10, 11:
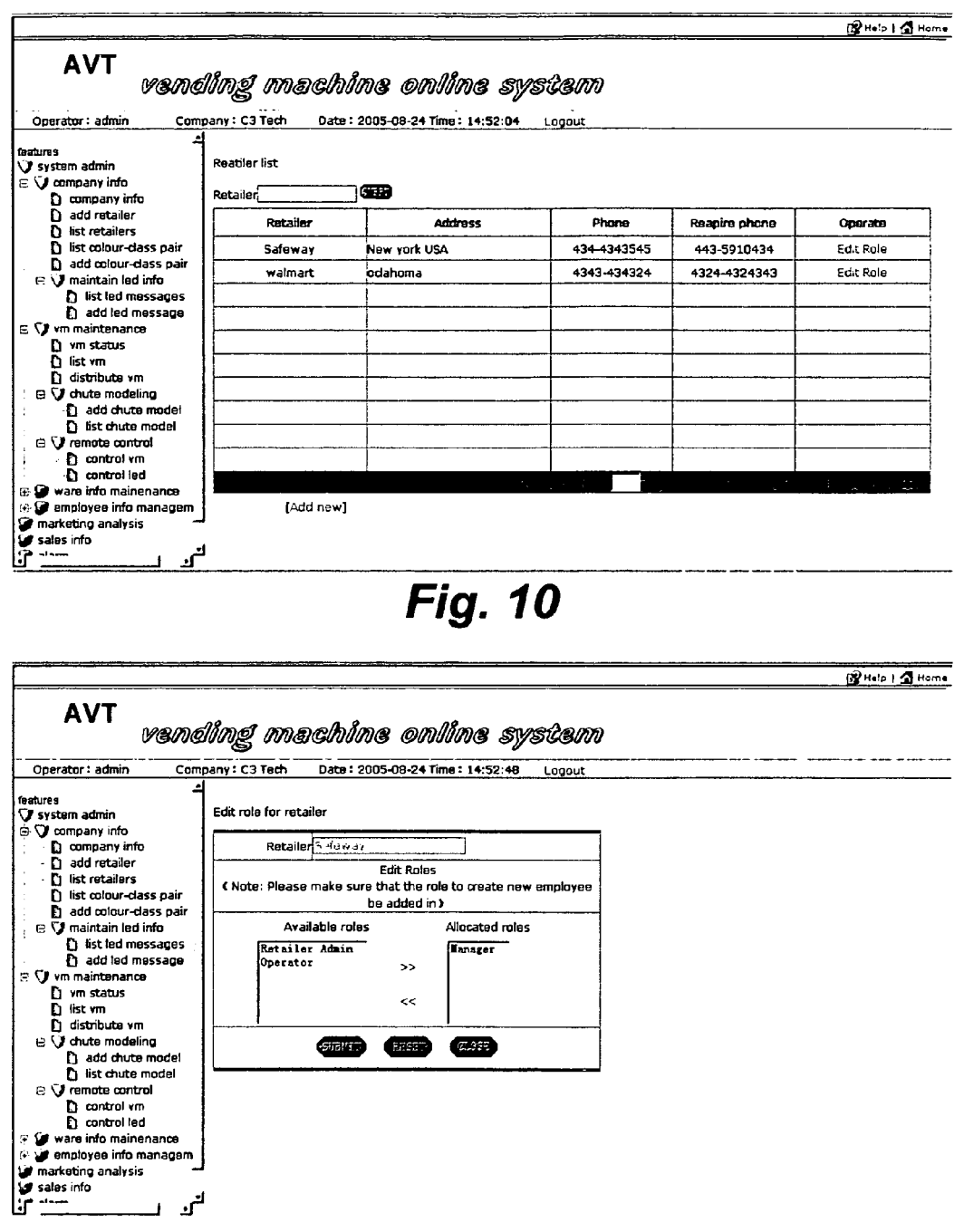
Figures 14, 15:
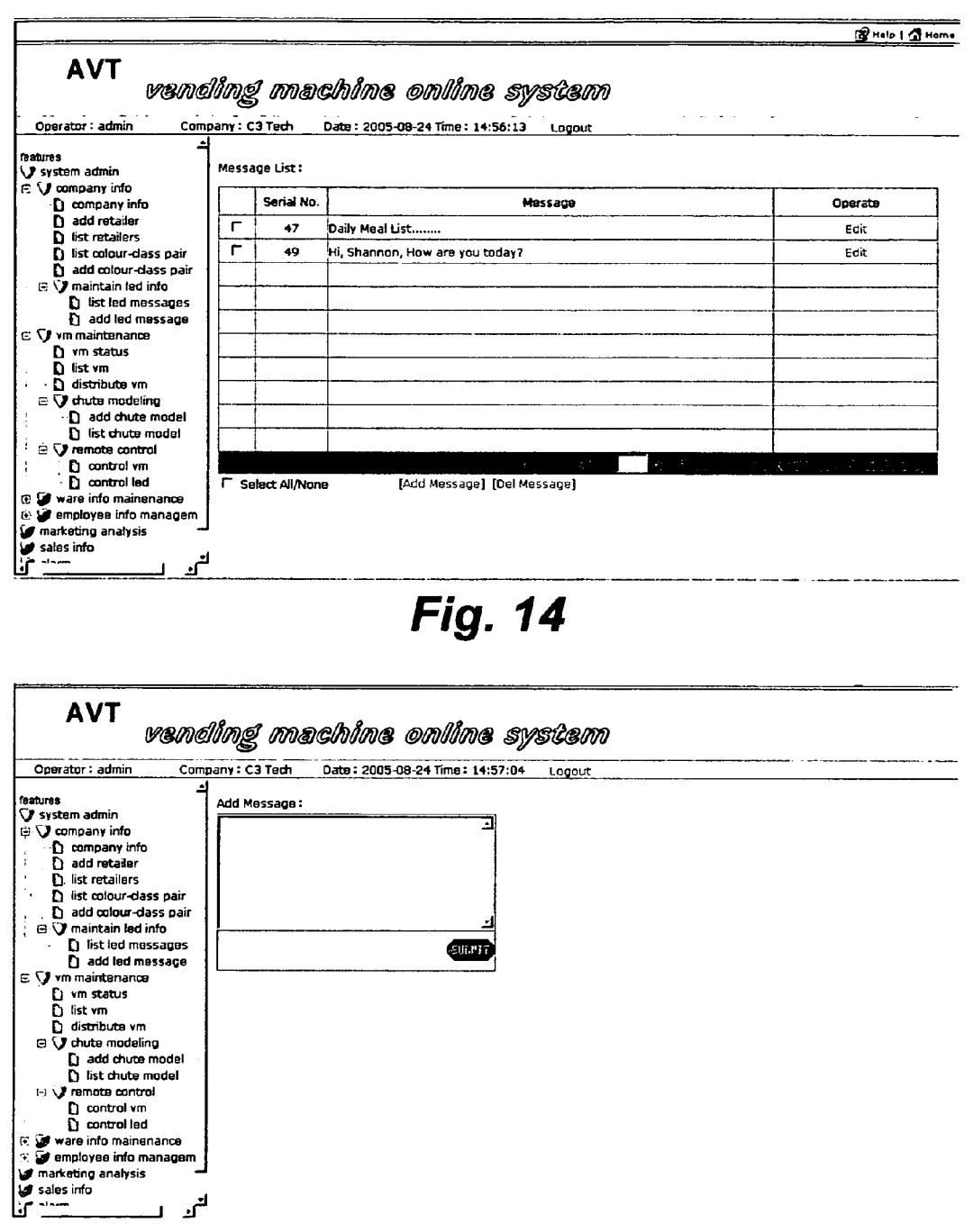

FIG. 8 depicts a graphical user interface through which basic company information may be edited by file 546 according to one embodiment of the present invention. FIG. 9 depicts a graphical user interface through which information relating to a new retailer may be added by file 548 according to one embodiment of the present invention. FIG. 10 depicts a graphical user interface through which a list of retailers may be accessed by file 550 according to one embodiment of the present invention. By clicking on the "edit role" button shown in FIG. 10, for example, the graphical user interface shown in FIG. 11 will be rendered to facilitate input of information relating to particular retailers. FIGS. 12 and 13 are graphical user interfaces for creating lists of and adding color-class pairs of alarms pursuant to files 552 and 554, respectively. The final graphical user interfaces for use in inputting and editing company information is shown in FIGS. 14 and 15. FIG. 14 depicts a graphical user interface for adding, editing, and deleting LED messages according to file 558, while FIG. 15 depicts a graphical user interface for inserting the text associated with a new LED message according to file 560.

Referring now to FIGS. 16 through 31, graphical user interfaces for use in controlling vending machine maintenance will now be described. FIG. 16, for example, depicts a list of individual vending machines with their respective status. Each vending machine (VM) is listed by its number, type, location, status, power, and operative status as controlled by file 564. FIG. 17 is a graphical user interface, which is rendered under control of file 566, and facilitates editing of the information associated with each vending machine. For example, by clicking on the "edit" hyperlink under the column designated "operate" in FIG. 17, the graphical user interface shown in FIG. 18 will be rendered. Information associated with a particular vending machine (e.g., VM type, retailer number, VM number, location, address, LED type, install date, and operator) may be edited and maintained within a database associated with the system 100. Such information may be submitted to the database by clicking on the "submit" button, reset by clicking on the "reset" button, or ignored by clicking on the "closed" button shown in FIG. 18. Information relating to the product mix contained within each particular vending machine may be accessed under control of file 570, as shown in FIG. 19. Other information relating to the distribution of vending machines may be similarly accessed and/or modified by way of the graphical user interfaces shown in FIGS. 20 and 21. For example, FIG. 20 facilitates allocation of the vending machines to a particular retailed, while FIG. 21 depicts a graphical user interface for a vending machine model distribution list.

Figures 22, 23:
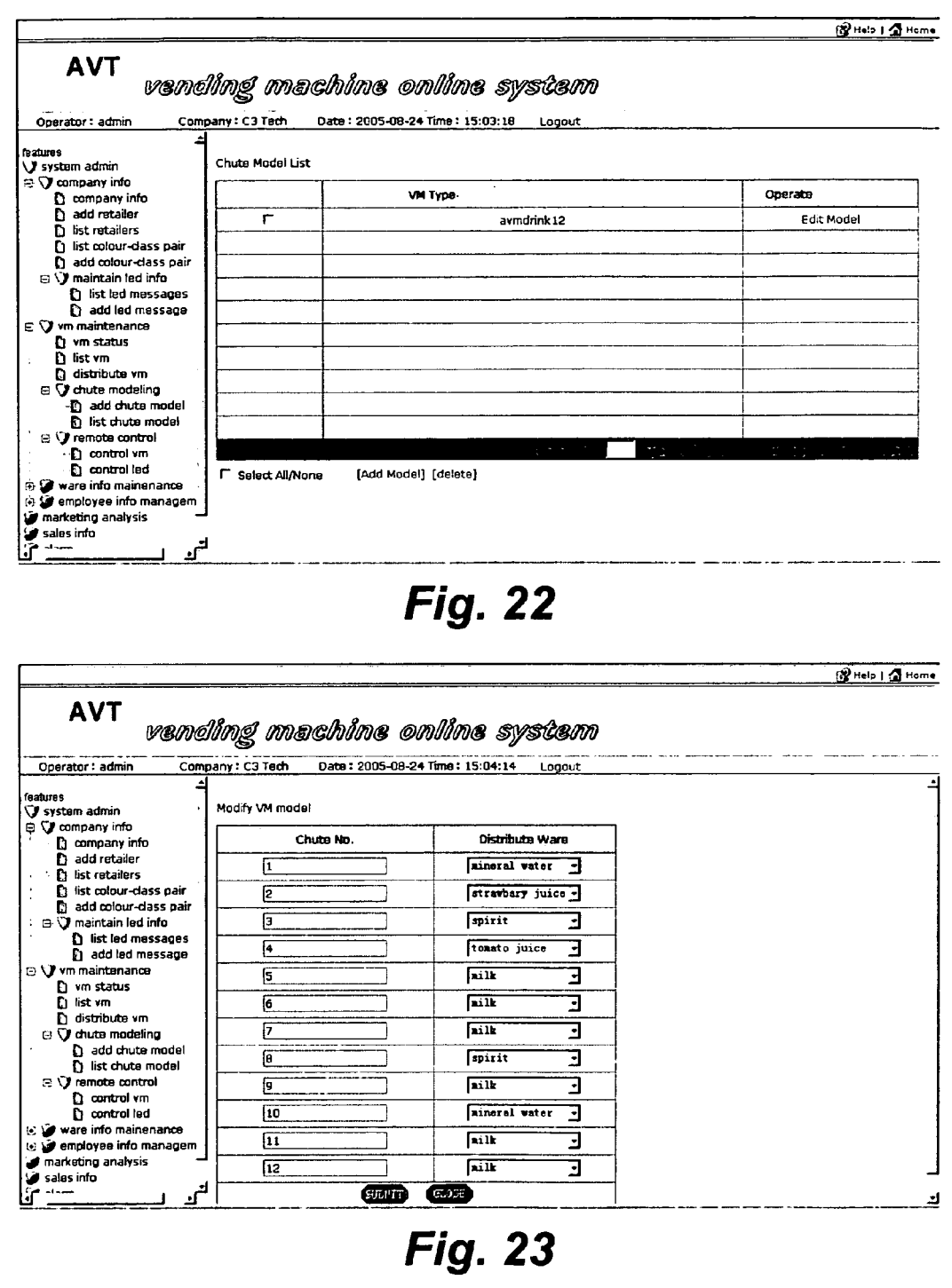

Information relating to individual chute modeling may be accessed or modified by way of the graphical user interfaces shown in FIGS. 22 and 23. For example, FIG. 22 depicts a chute model list which may include a plurality of different models. In the event that the user desired to modify the chute model of a given vending machine type, the user could select "edit model". Thereafter, the graphical user interface shown in FIG. 23 would be rendered, permitting the user to modify the vending machine model on a chute-by-chute basis. Both of these actions could be undertaken by selecting file 570.

Figures 24, 25:
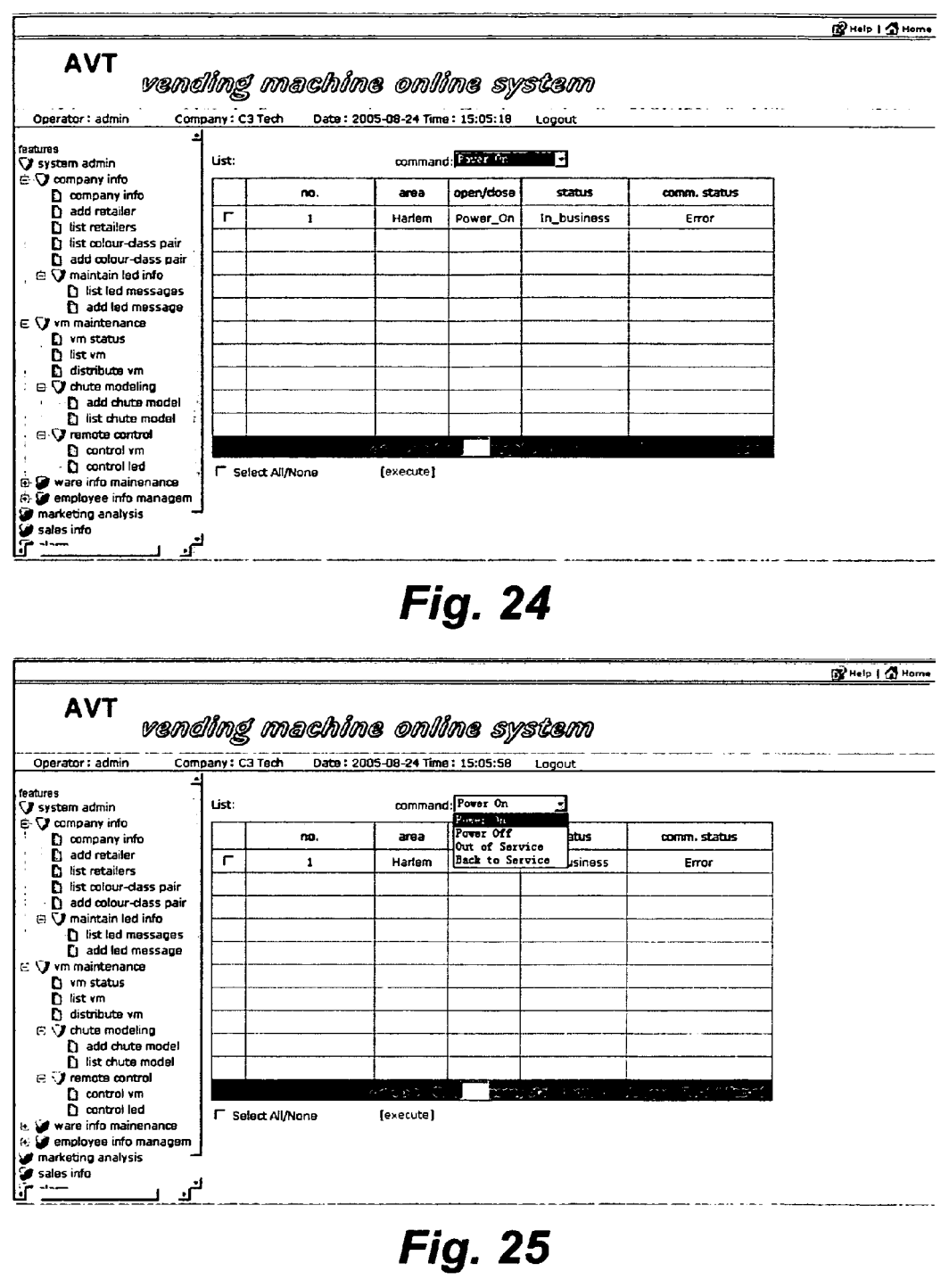
Figures 26, 27:
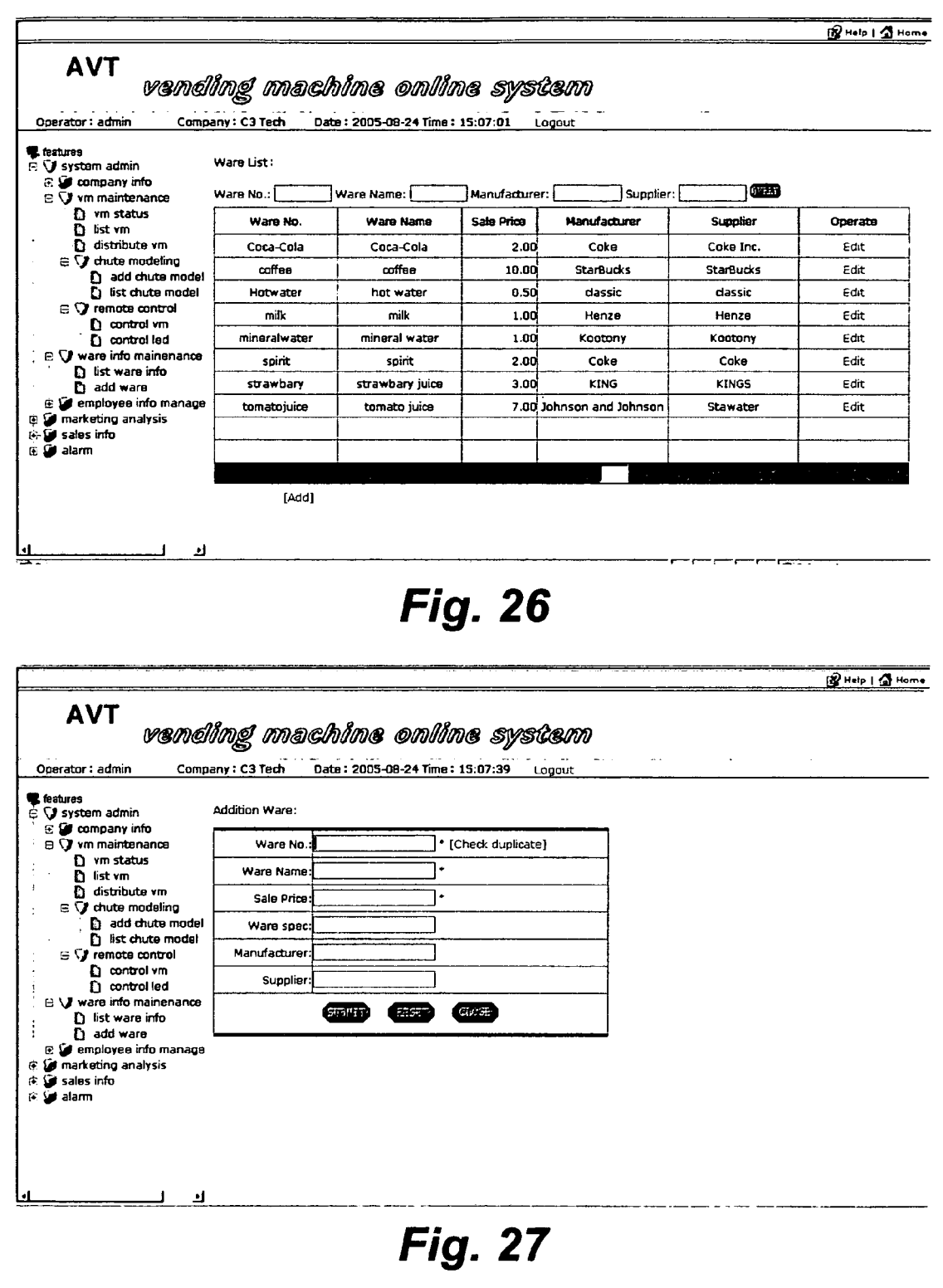

Remote control of each vending machine is facilitated by way of file 572. Upon selection of such file, the graphical user interface shown in FIG. 24 would be rendered. The user may initially control the vending machine by way of the drop down "command" menu, which enables the user to select "power on","power off", "out of service",and "back to service",and thereby cause the vending machine to follow the selected command as shown in FIG. 25. As shown in FIGS. 26 and 27, information relating to ware information maintenance may be input or modified under control of file 574 by ware number, ware name, sales price, manufacturer, and supplier. In the event that the user desired to edit such list or make an addition thereto, the user would merely click on the "edit" or "add" hyperlink shown in FIG. 26. Upon such selection, the graphical user interface shown in FIG. 27 would be rendered, requiring input of at least the ware number, ware name, and sales price as indicated by the asterisk.

Figures 28, 29:
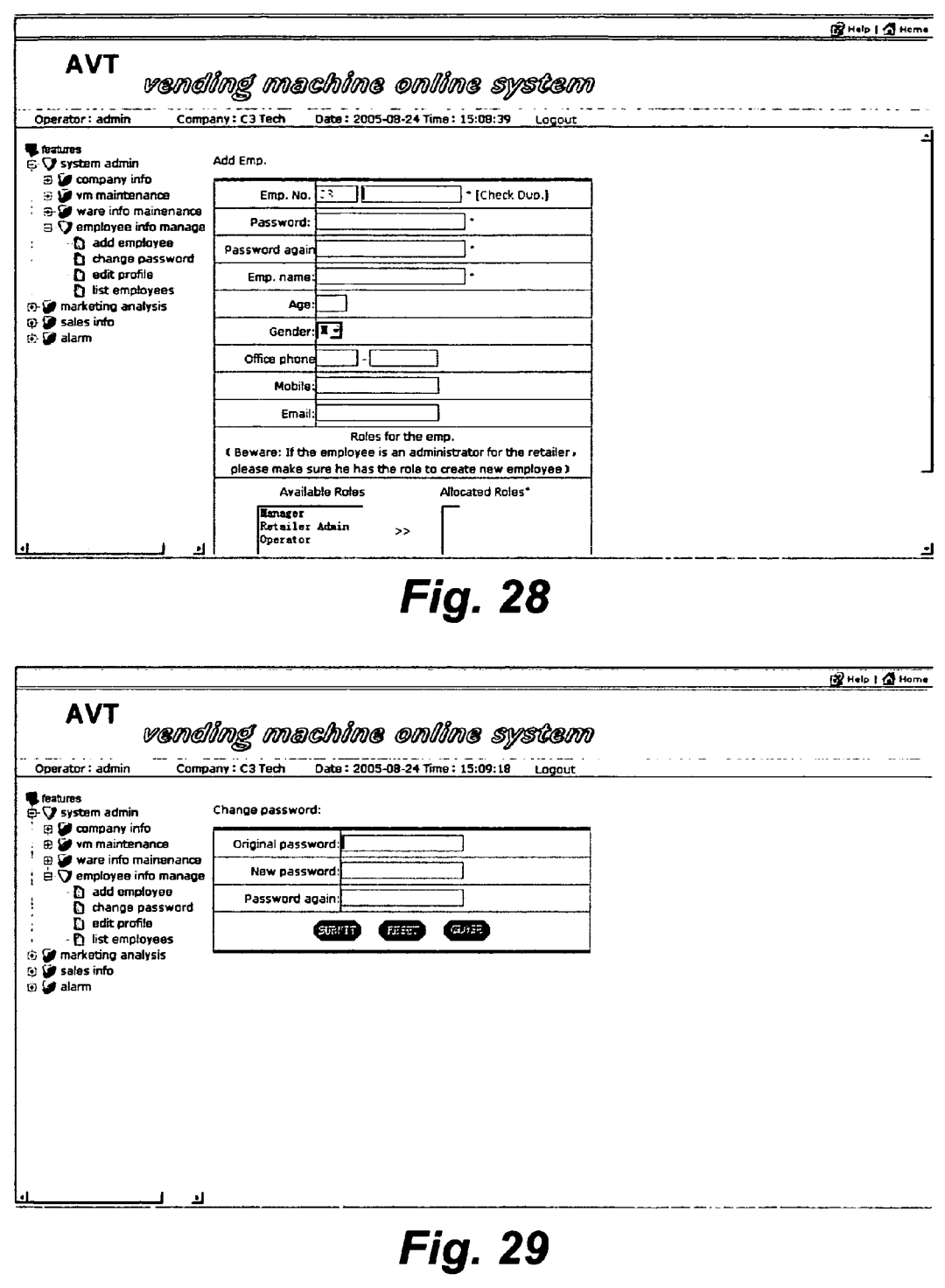
Figures 30, 31:
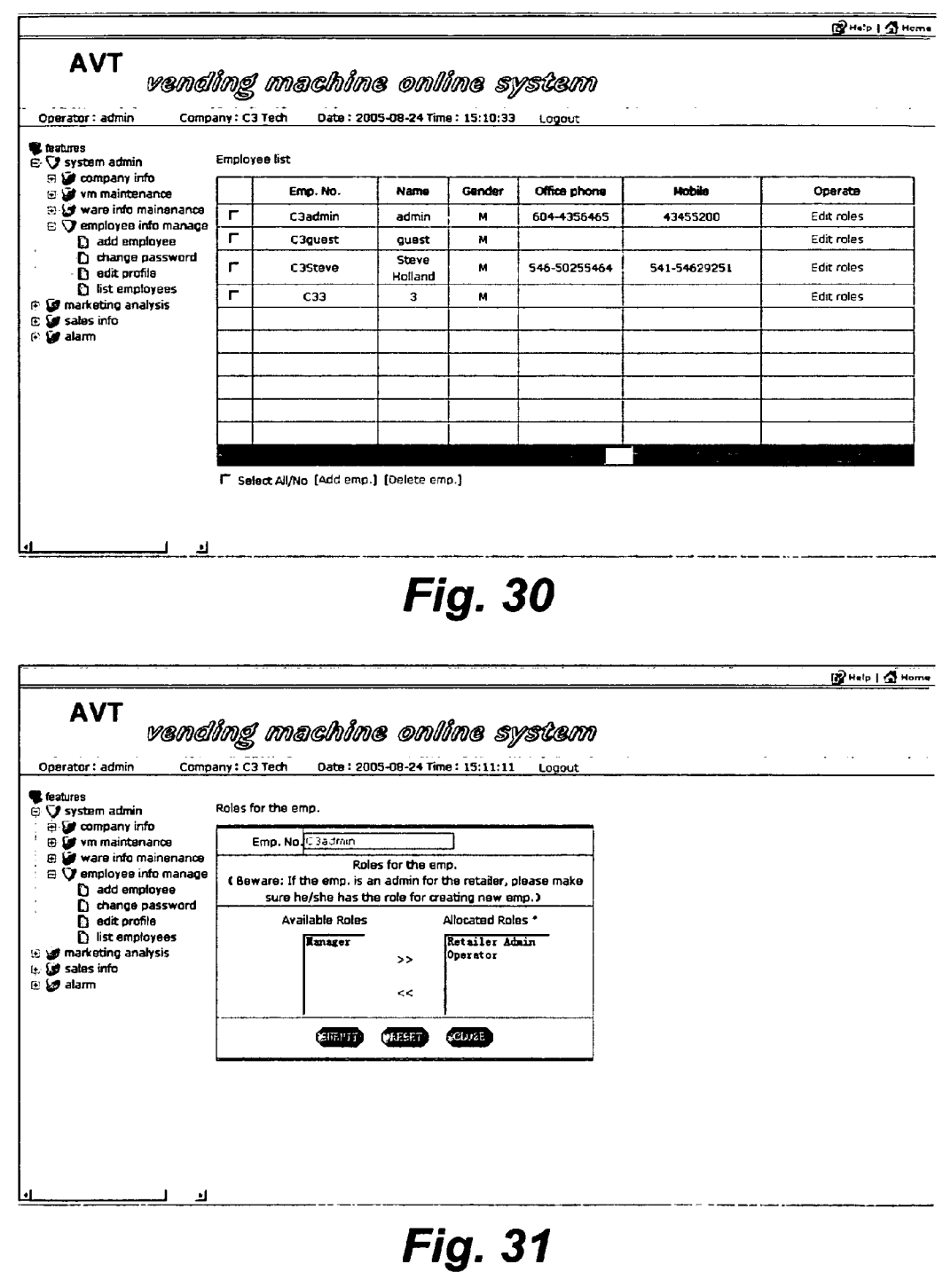

Finally, input, modification, and management of employee information may be accomplished by way of file 576. Selecting that file will cause the file manager to display at least four other documents relating to the addition of an employee, change of password, editing a profile, and listing the employees. FIG. 28, for example, depicts a graphical user interface through which information relating to a new employee may be added to the system 100. FIG. 29 depicts a graphical user interface for changing an employee's password. A list of the employees for a given vendor is shown in FIG. 30. By selecting the "edit roles" hyperlink, a user will be presented with the graphical user interface shown in FIG. 31, thereby permitting changes to an employee'ss permitted roles.

Figure 32:
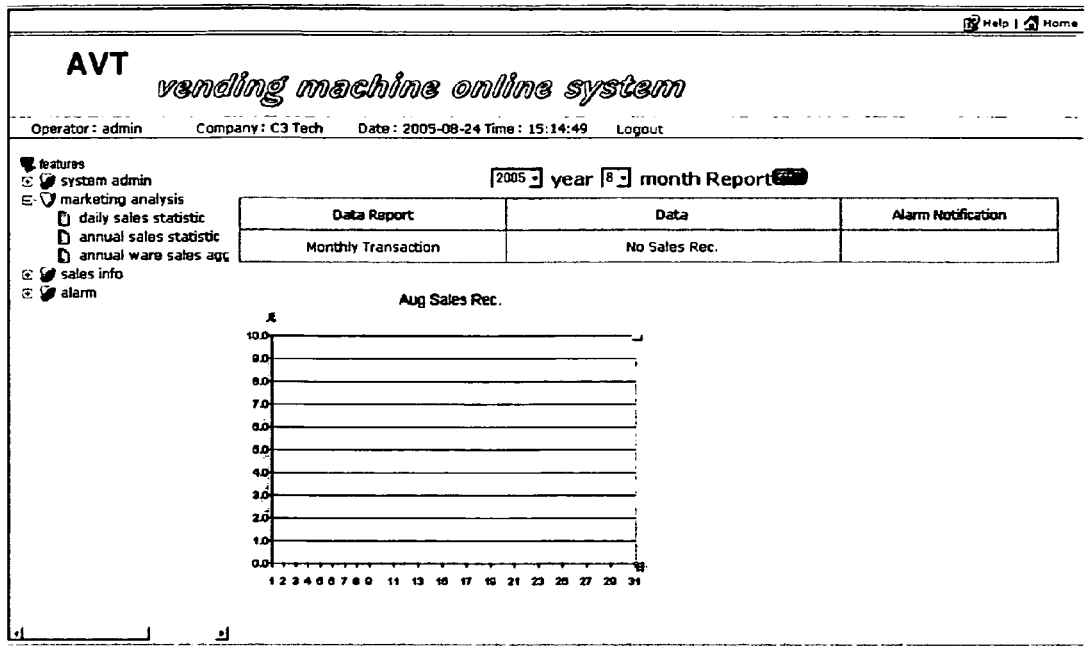
Figure 33:
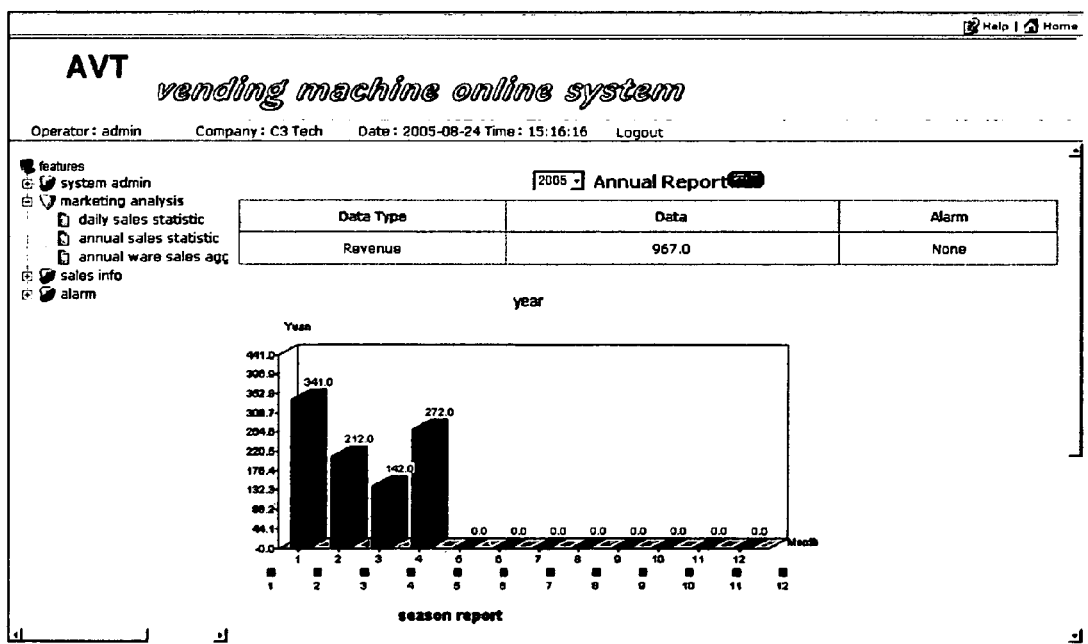
Figure 34:
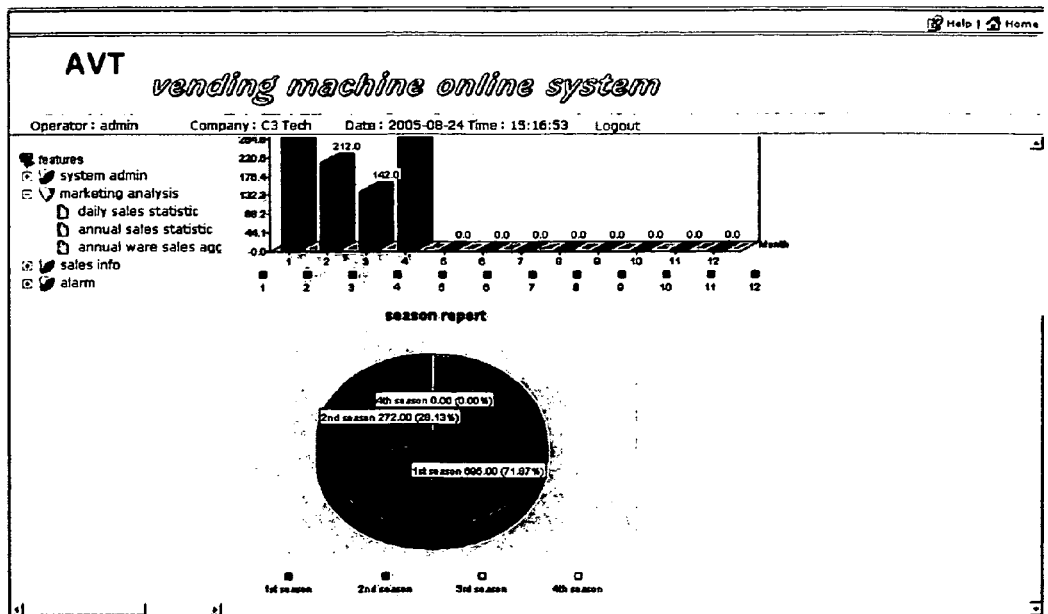
Figure 35:
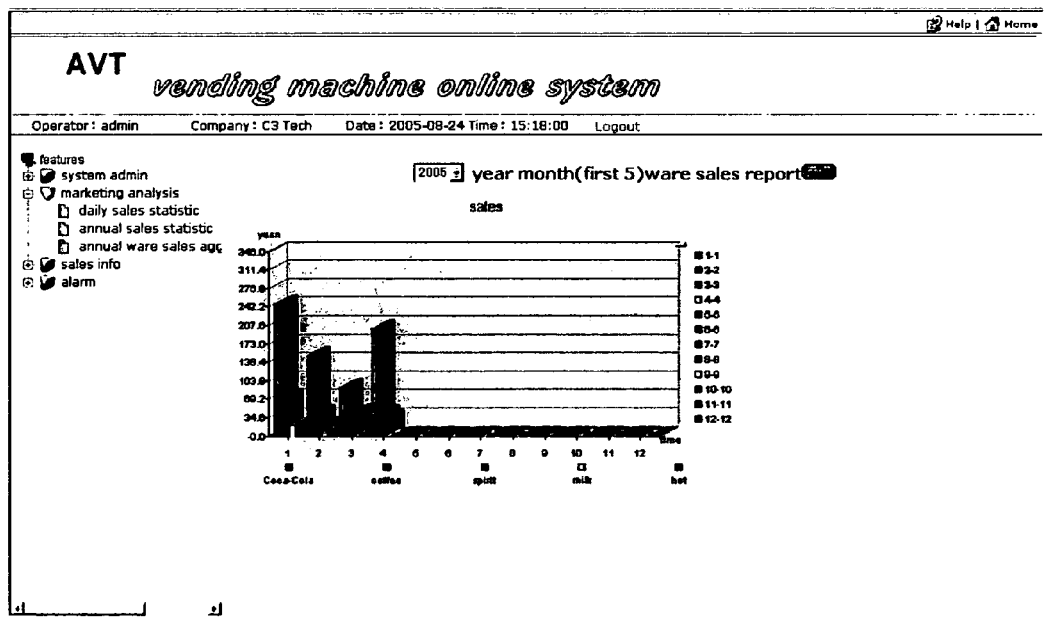
Figures 36, 37:
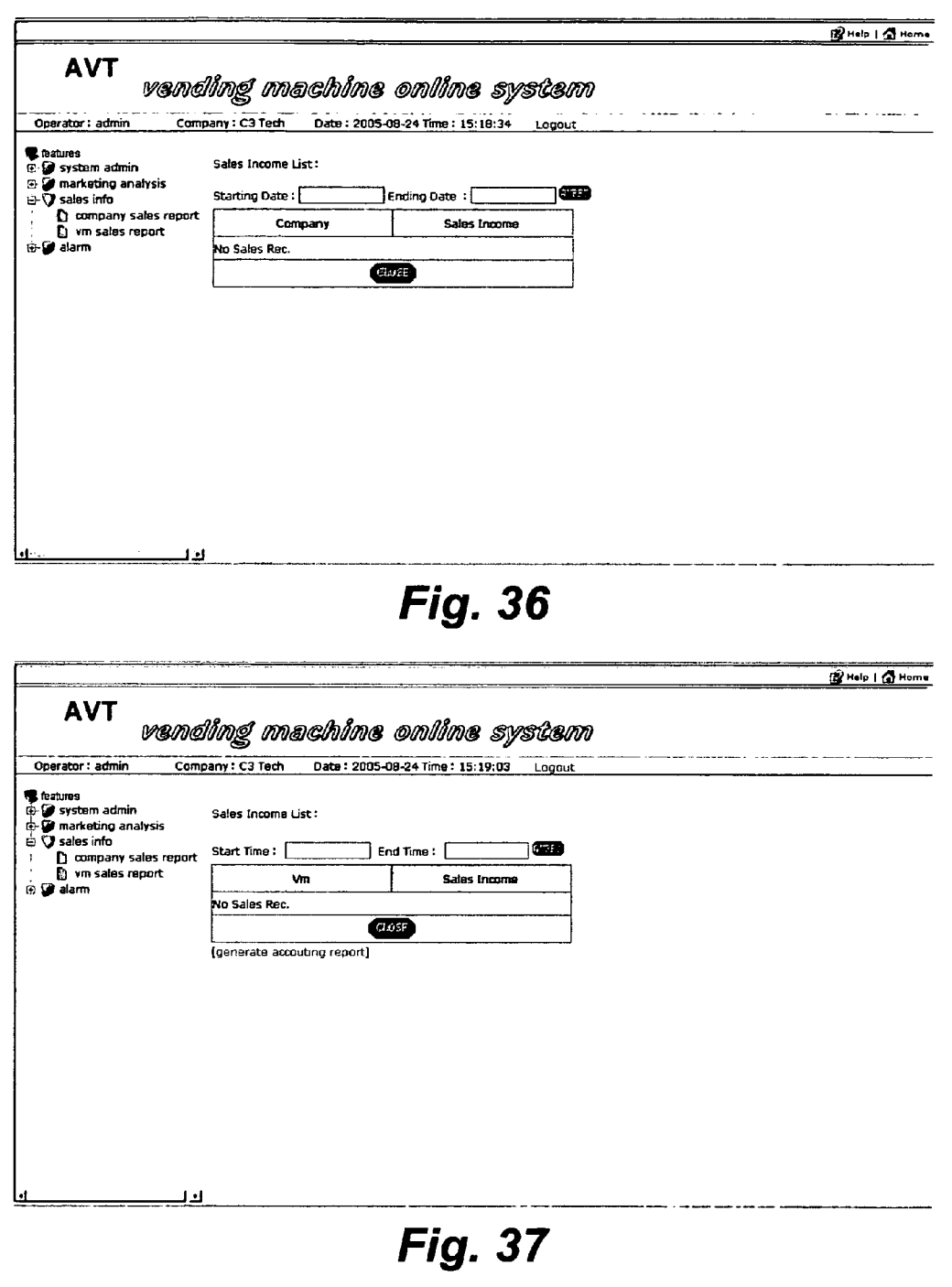
Figure 38:
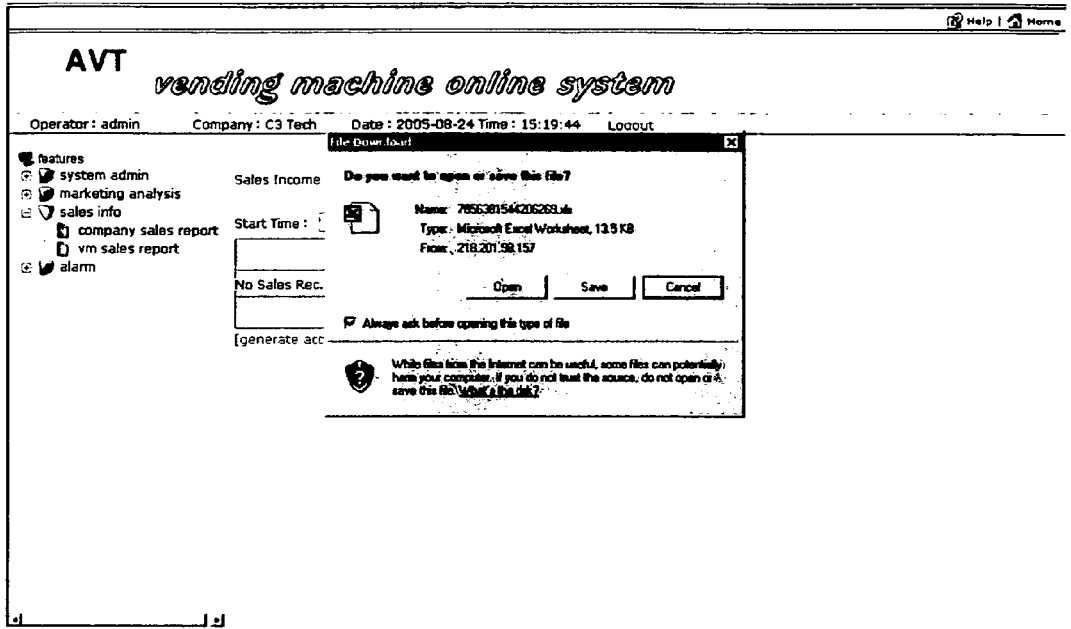
Figure 39:
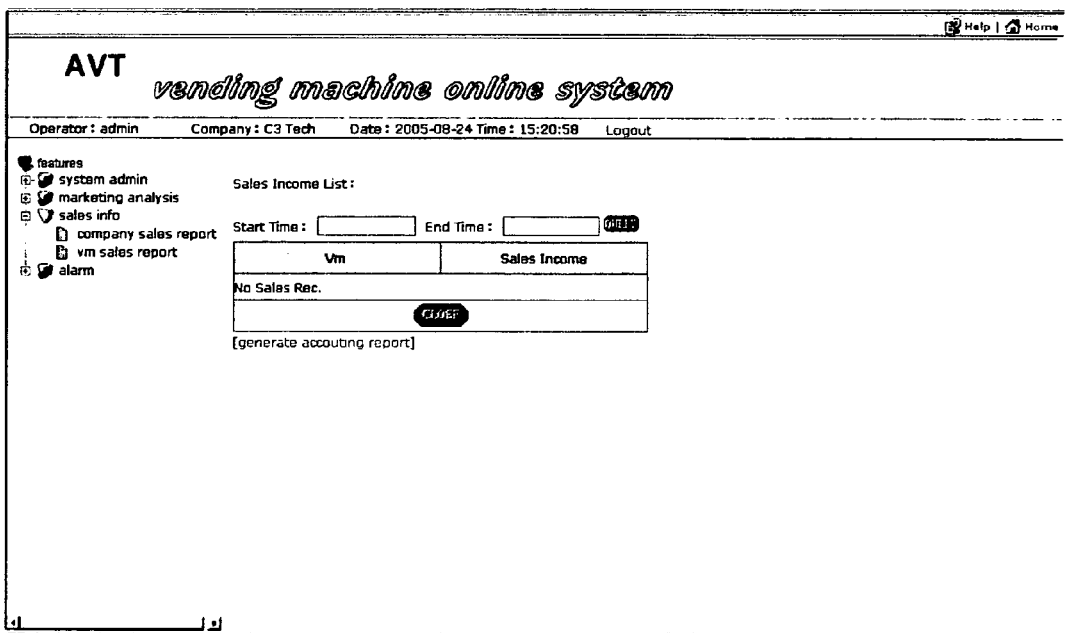

Referring now to FIGS. 32 through 39, graphical user interfaces associated with marketing analysis will now be described. As shown in FIG. 32, a user may access data and prepare a monthly report. Alternatively, and as shown in FIGS. 33 and 34, a user may also access data and prepare an annual report shown in bar chart and pie chart formats. FIG. 35 depicts a bar chart illustrating the ware sales aggregation listing. Finally, FIGS. 36 through 39 show various graphical user interfaces which may be used to generate company sales reports under control of file 588 and vending machine sale reports under control of file 590.

Referring now to FIGS. 40 through 54, graphical user interfaces associated with vending machine alarms will now be described. FIG. 40 depicts the status of real time alarms. FIG. 41 depicts a history alarm query by vending machine number, serial number, and location, and facilitates a display of the details of such alarms by machine and by alarm. For example, FIGS. 42 and 43 depict vending machine queries sorted first by vending machine number and then by malfunction description. FIG. 44 depicts an alarm method list by which the user may designate the appropriate response to any given alarm description. Merely by selecting the "edit" hyperlink shown in FIG. 44, the user will be presented with the graphical user interface shown in FIG. 45, thereby permitting the user to change the notification method by which a given alarm will be responded to.

An alarm class list as shown in FIG. 46 may be accessed by the user as well. By selecting the "edit" hyperlink shown in FIG. 46, the user may change the alarm class with the graphical user interface shown in FIG. 47. Moreover, any given alarm class may be added to the list of deleted there from by selecting one of the "add new" or "delete selected class" hyperlinks shown in FIG. 46. In the event that the user selected the "add new" hyperlink, the graphical user interface shown in FIG. 48 would be displayed. The user could then select an alarm type from the drop down menu shown in FIGS. 49 through 51. Based on the type selected, the user could then select a notification method by way of the graphical user interface shown in FIG. 52. Finally, data relating to ware wanting alarms and latest data transfer time may be accessed by way of the graphical user interfaces shown in FIGS. 53 and 54.

Having fully described the system and method according to embodiments of the present invention, it should be understood that one important aspect of the invention is the capability of the system 100, 100' to provide multimedia control and management that may be adapted to include advertisements as well. Advertisement content may be served up to the touch screen display 410 shown in FIG. 4, either from a server 145 from within the enterprise control center 130 or from one of the application servers 325₁ ... 325ₙ, coupled to the web servers 320₁ ... 320ₙ shown in FIG. 3. Such advertisement content may be specifically targeted to selections made by the purchaser (e.g., a Coca-Cola advertisement in response to selections of salty snacks) or by information input by the purchaser to complete the transaction (e.g., a geographic-specific advertisement based on the purchaser's ZIP code entered to validate a credit card purchase).

Although this invention has been described in certain specific embodiments, many additional modifications and variations would be apparent to those skilled in the art. It is, therefore, to be understood that this invention may be practiced otherwise than as specifically described.

For example, while two-way, wireless communication in the form of a GSM network has been disclosed, it should be understood that other forms of two-way wireless communication networks may be used. Furthermore, while control of the system 100, 100' has been described in the context of an enterprise control center 130 or ASP means 200, it should be readily understood that authorized access to the system according to embodiments of the present invention may be accomplished over the Internet 125 through one or more "clients". Such clients, in turn, may suitably comprise one or more conventional personal computers and workstations, operating either as a "fat" client or a "thin" client. However, other clients such as Web-enabled hand-held devices (e.g., the Palm V™ organizer manufactured by Palm, Inc., Santa Clara, Calif. U.S.A., Windows CE devices, and "smart" phones) which use the wireless access protocol, and Internet appliances fall within the spirit and scope of the present invention.

Thus, the present embodiments of the invention should be considered in all respects as illustrative and not restrictive, the scope of the invention to be determined by any claims supported by this application and the claims equivalents rather than the foregoing description. The invention, therefore, as defined in the appended claims' is intended to cover all such changes and modifications as fall within the true spirit of the invention.

I claim:

1. A wireless system for managing a plurality of remote vending machines, comprising:
   an enterprise control center including a plurality of graphical user interfaces each of which is adapted to control aspects in real-time of the customer interaction of selectable ones of the plurality of remote vending machines; and
   a two-way wireless network coupling said enterprise control center and the plurality of remote vending machines;
   wherein each of the plurality of remote vending machines is wirelessly coupled by a first coupling means to said wireless network which is, in turn, coupled by a second coupling means to a large-scale network,
   wherein the enterprise control center is adapted to provide one or more graphical user interfaces by which a user may add an alarm to an alarm class list based on a selection of an alarm type for the alarm class and a selection of an alarm notification for the alarm class.

2. The wireless system according to claim 1, further comprising:
   a touch screen associated with each of the plurality of vending machines for selecting items to be vended therein; and
   means for displaying a plurality of advertisements on said touch screen.

3. The wireless system according to claim 2, wherein said touch screen further comprises means for paying for said items to be vended within the plurality of vending machines.

4. The wireless system according to claim 2, further comprising a plurality of touch screen interfaces, one or more of which are adapted to select categories of items from which to purchase, one or more of which are adapted to select specific items to purchase from those categories, and one or more of which are adapted to select methods of payment for such purchases.

5. The wireless system according to claim 4, wherein said selectable methods of payment are selectable from the group consisting of cash/coin, credit/debit, and charge-to-room.

6. The wireless system according to claim 4, further comprising means adapted to facilitate a selection of multiple items and subsequent payment by way of the selected method of payment in a single transaction.

7. The wireless system according to claim 2, further comprising a plurality of touch screen selection points within which a selection can be made from a simple menu displayed on the touch screen display.

8. The wireless system according to claim 7, further comprising:
   a first level of touch screen selection points for displaying and selecting one or more categories of items to be purchased;
   a second level of touch screen selection points for displaying and selecting a plurality of individual items within those categories;
   a third level of touch screen selection points for providing the purchaser an option to checkout or select another item; and
   a fourth level of touch screen selection points for providing the purchaser an option to selecting a method of payment from the group consisting of cash, credit card, charge-to-room, and combinations thereof.

9. The wireless system according to claim 2, wherein the enterprise control center is adapted to provide an advertisement specifically targeted to selections of the customer or information input by the customer,
   wherein the touch screen associated with one or more remote vending machines of the plurality of remote vending machines is adapted to display the advertisement.

10. The wireless system according to claim 1, wherein said wireless network comprises a GSM network.

11. The wireless system according to claim 1, further comprising a file manager including a hierarchical listing of a plurality of folders, which correspond to a plurality of folders and/or files for generating said graphical user interfaces.

12. The wireless system according to claim 11, wherein said file manager including a plurality of top-level folders for controlling system administration, marketing analysis, sales information, and alarm conditions.

13. The wireless system according to claim 1, wherein said large-scale network is selected from the group consisting of the World Wide Web, one or more intranets, one or more extranets, one or more Virtual Private Networks (VPNs), and combinations thereof.

14. The wireless system according to claim 1, wherein said second coupling means is adapted to be used to couple communications from the plurality of vending machines through the wireless network and large-scale network, to said enterprise control center which comprises a local area network of computers coupled together, including one or more desktop computers, one or more workstations, one or more servers, one or more laptop computers, one or more personal digital assistants (PDAs), one or more pen-based notebooks, or combinations thereof.

15. The wireless system according to claim 1, wherein the enterprise control center is adapted to receive commands from a user though the graphical user interfaces and wirelessly control aspects in real-time of the customer interaction of selectable ones of the plurality of remote vending machines based on the received commands.

16. The wireless system according to claim 14, wherein the graphical user interfaces comprise graphical user interfaces of a file manager including a plurality of top-level folders for controlling system administration, marketing analysis, sales information, and alarm conditions.

17. The wireless system according to claim 1, wherein each of the plurality of vending machine is adapted to receive a wireless payment from a purchaser.

18. The wireless system according to claim 1, wherein the wireless payment comprises at least one of: a payment by mobile phone or a payment by radio frequency identification (RFID).

19. The wireless system according to claim 1, wherein each of the plurality of vending machine is adapted to wirelessly settle a purchaser's transaction.

* * * * *

(12) EX PARTE REEXAMINATION CERTIFICATE (9655th)
United States Patent
Illingworth et al.

(10) Number: US 8,191,779 C1
(45) Certificate Issued: May 15, 2013

(54) WIRELESS MANAGEMENT OF REMOTE VENDING MACHINES

(75) Inventors: Shannon Wayne Illingworth, Corona, CA (US); James Winsor, Corona, CA (US)

(73) Assignee: AVT, Inc., Corona, CA (US)

Reexamination Request:
No. 90/012,431, Aug. 20, 2012

Reexamination Certificate for:
Patent No.: 8,191,779
Issued: Jun. 5, 2012
Appl. No.: 11/588,422
Filed: Oct. 27, 2006

Related U.S. Application Data

(60) Provisional application No. 60/730,369, filed on Oct. 27, 2005.

(51) Int. Cl.
*G06F 7/08* (2006.01)
*G06F 17/00* (2006.01)

(52) U.S. Cl.
USPC ............ 235/381; 700/231; 700/236; 700/244

(58) Field of Classification Search
None
See application file for complete search history.

(56) References Cited

To view the complete listing of prior art documents cited during the proceeding for Reexamination Control Number 90/012,431, please refer to the USPTO's public Patent Application Information Retrieval (PAIR) system under the Display References tab.

*Primary Examiner* — Yuzhen Ge

(57) ABSTRACT

A wireless system for managing a plurality of remote vending machines includes an enterprise control center; and a two-way wireless network coupling the enterprise control center and the plurality of remote vending machines. A touch screen may be associated with each of the plurality of vending machines for selecting items to be vended therein, and means for displaying a plurality of advertisements on the touch screen. The touch screen may also include means for paying for the items to be vended within the plurality of vending machines.

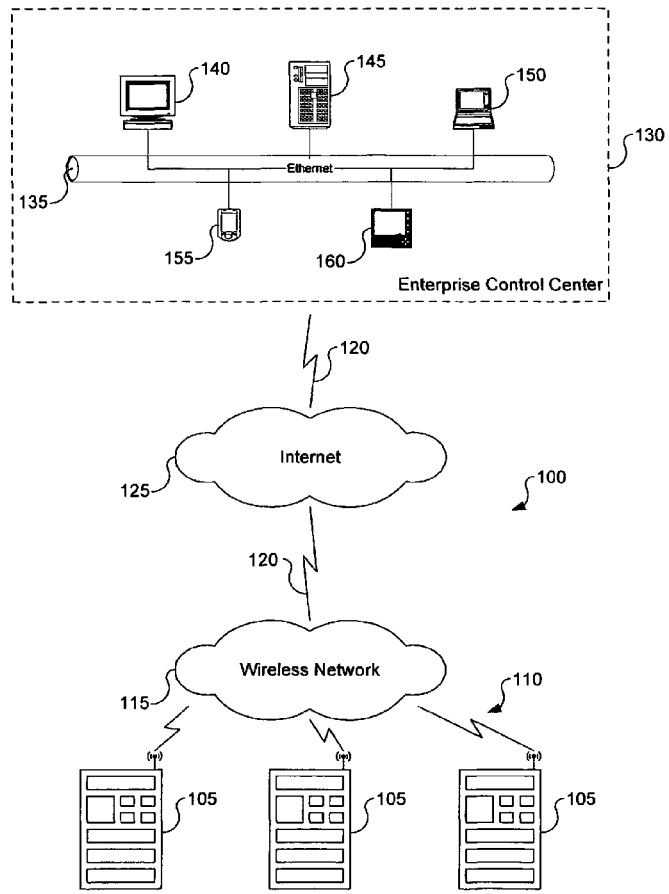

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1 and 17-19 are determined to be patentable as amended.

Claims 2-16, dependent on an amended claim, are determined to be patentable.

New claim 20 is added and determined to be patentable.

1. A wireless system for managing a plurality of remote vending machines, comprising:
   an enterprise control center including a plurality of graphical user interfaces each of which is adapted to:
      control aspects in real-time of [the] *a* customer interaction of selectable ones of the plurality of remote vending machines,
      *control a selected vending machine from the plurality of remote vending machines by enabling selection of an out of service command or a back to service command, and*
      prepare a report reflecting a ware sales aggregation listing of the plurality of vending machines; and
   a two-way wireless network coupling said enterprise control center and the plurality of remote vending machines;
   wherein each of the plurality of remote vending machines is wirelessly coupled by a first coupling means to said wireless network which is, in turn, coupled by a second coupling means to a large-scale network,
   wherein the enterprise control center is adapted to provide one or more graphical user interfaces by which a user may add an alarm to an alarm class list based on a selection of an alarm type for the alarm class and a selection of an alarm notification for the alarm class.

17. The wireless system according to claim 1, wherein each of the plurality of vending [machine] *machines* is adapted to receive a wireless payment from a purchaser *for purchase of a product in at least one of the plurality of vending machines*.

18. The wireless system according to claim [1] *17*, wherein the wireless payment comprises at least one of: a payment by mobile phone or a payment by radio frequency identification (RFID).

19. The wireless system according to claim 1, wherein each of the plurality of vending [machine] *machines* is adapted to wirelessly settle a purchaser's transaction *for purchase of a product in at least one of the plurality of vending machines*.

20. *A wireless system for managing a plurality of remote vending machines, comprising:*
   *an enterprise control center including a plurality of graphical user interfaces each of which is adapted to:*
      *control aspects in real-time of a customer interaction with at least one of the plurality of remote vending machines,*
      *control a selected vending machine from the plurality of vending machines by enabling selection of an out of service command or back to service command, and*
      *prepare a revenue report on the plurality of vending machines, wherein the report is displayed in bar chart and pie chart format; and*
   *a two-way wireless network coupling said enterprise control center and the plurality of remote vending machines;*
   *wherein each of the plurality of remote vending machines is wirelessly coupled by a first coupling means to said wireless network which is, in turn, coupled by a second coupling means to a large-scale network,*
   *wherein the enterprise control center is adapted to provide one or more graphical user interfaces by which a user may add an alarm to an alarm class list based on a selection of an alarm type for the alarm class and a selection of an alarm notification for the alarm class, wherein the alarm class is associated with a color,*
   *wherein the enterprise control center is adapted to transmit the selected command from the enterprise control center to the selected vending machine, and*
   *wherein the selected vending machine receives and executes the selected command transmitted from the enterprise control center.*

\* \* \* \* \*

(12) EX PARTE REEXAMINATION CERTIFICATE (10294th)
United States Patent
Illingworth et al.

(10) Number: US 8,191,779 C2
(45) Certificate Issued: Sep. 9, 2014

(54) WIRELESS MANAGEMENT OF REMOTE VENDING MACHINES

(75) Inventors: Shannon Wayne Illingworth, Corona, CA (US); James Winsor, Corona, CA (US)

(73) Assignee: AVT, Inc., Corona, CA (US)

Reexamination Request:
No. 90/013,043, Oct. 25, 2013

Reexamination Certificate for:
Patent No.: 8,191,779
Issued: Jun. 5, 2012
Appl. No.: 11/588,422
Filed: Oct. 27, 2006

Reexamination Certificate C1 8,191,779 issued May 15, 2013

Related U.S. Application Data

(60) Provisional application No. 60/730,369, filed on Oct. 27, 2005.

(51) Int. Cl.
*G06F 7/08* (2006.01)
*G06F 17/00* (2006.01)

(52) U.S. Cl.
USPC .......................................... 235/381; 700/231

(58) Field of Classification Search
None
See application file for complete search history.

(56) References Cited

To view the complete listing of prior art documents cited during the proceeding for Reexamination Control Number 90/013,043, please refer to the USPTO's public Patent Application Information Retrieval (PAIR) system under the Display References tab.

*Primary Examiner* — Majid A. Banankhah

(57) ABSTRACT

A wireless system for managing a plurality of remote vending machines includes an enterprise control center; and a two-way wireless network coupling the enterprise control center and the plurality of remote vending machines. A touch screen may be associated with each of the plurality of vending machines for selecting items to be vended therein, and means for displaying a plurality of advertisements on the touch screen. The touch screen may also include means for paying for the items to be vended within the plurality of vending machines.

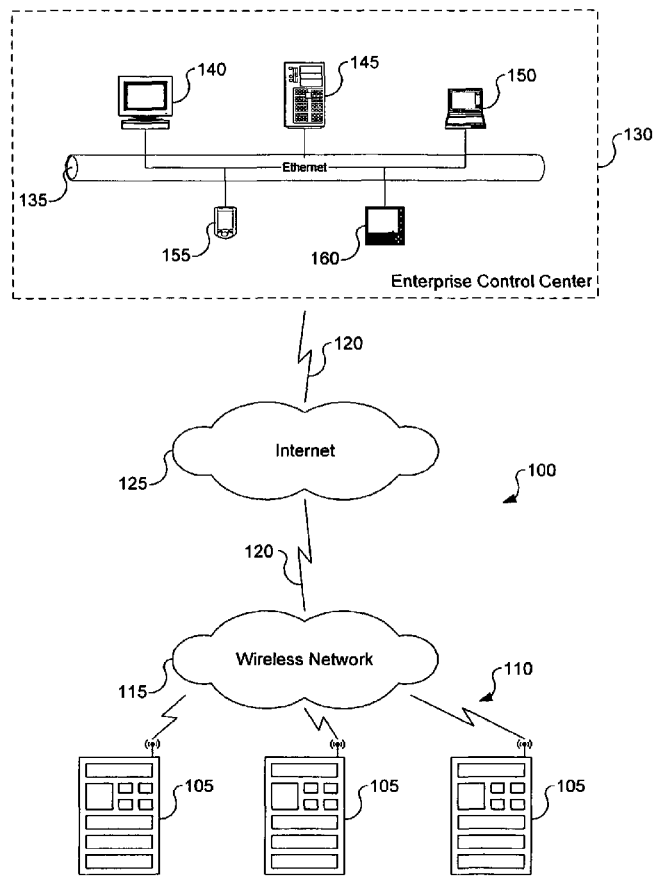

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1 and 20 are determined to be patentable as amended.

Claims 2-19, dependent on an amended claim, are determined to be patentable.

1. A wireless system for managing a plurality of remote vending machines, comprising:
   an enterprise control center including a plurality of graphical user interfaces each of which is adapted to:
      control aspects in real-time of a customer interaction of selectable ones of the plurality of remote vending machines,
      control a selected vending machine from the plurality of remote vending machines by enabling *a* selection of *a power on command, a power off command,* an out of service command [or], *and* a back to service command, *wherein the selected vending machine performs the selected command,* and
      prepare a report reflecting a ware sales aggregation listing of the plurality of vending machines; and
   a two-way wireless network coupling said enterprise control center and the plurality of remote vending machines;
   wherein each of the plurality of remote vending machines is wirelessly coupled by a first coupling means to said wireless network which is, in turn, coupled by a second coupling means to a large-scale network,
   wherein the enterprise control center is adapted to provide one or more graphical user interfaces by which a user may add an alarm to an alarm class list based on a selection of an alarm type for the alarm class and a selection of an alarm notification for the alarm class.

20. A wireless system for managing a plurality of remote vending machines, comprising:
   an enterprise control center including a plurality of graphical user interfaces each of which is adapted to:
      control aspects in real-time of a customer interaction with at least one of the plurality of remote vending machines,
      control a selected vending machine from the plurality of vending machines by enabling *a* selection of *a power on command, a power off command,* an out of service command [or], *and* a back to service command, *wherein the selected vending machine performs the selected command,* and
      prepare a revenue report on the plurality of vending machines, wherein the report is displayed in bar chart and pie chart format; and
   a two-way wireless network coupling said enterprise control center and the plurality of remote vending machines;
   wherein each of the plurality of remote vending machines is wirelessly coupled by a first coupling means to said wireless network which is, in turn, coupled by a second coupling means to a large-scale network,
   wherein the enterprise control center is adapted to provide one or more graphical user interfaces by which a user may add an alarm to an alarm class list based on a selection of an alarm type for the alarm class and a selection of an alarm notification for the alarm class, wherein the alarm class is associated with a color,
   wherein the enterprise control center is adapted to transmit the selected command from the enterprise control center to the selected vending machine, and
   wherein the selected vending machine receives and executes the selected command transmitted from the enterprise control center.

\* \* \* \* \*